(12) United States Patent
Nakajima et al.

(10) Patent No.: US 10,511,489 B2
(45) Date of Patent: Dec. 17, 2019

(54) STORAGE OPERATIONAL MANAGEMENT SERVICE PROVIDING APPARATUS, STORAGE OPERATIONAL MANAGEMENT SERVICE PROVIDING METHOD, AND STORAGE OPERATIONAL MANAGEMENT SYSTEM

(71) Applicant: Hitachi, Ltd., Tokyo (JP)

(72) Inventors: Noriko Nakajima, Tokyo (JP); Jun Nakajima, Tokyo (JP); Nobuhiro Maki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 212 days.

(21) Appl. No.: 15/554,098

(22) PCT Filed: Sep. 30, 2015

(86) PCT No.: PCT/JP2015/077692
§ 371 (c)(1),
(2) Date: Aug. 28, 2017

(87) PCT Pub. No.: WO2017/056218
PCT Pub. Date: Apr. 6, 2017

(65) Prior Publication Data
US 2018/0034708 A1 Feb. 1, 2018

(51) Int. Cl.
*H04L 29/08* (2006.01)
*G06Q 10/00* (2012.01)
*H04L 12/24* (2006.01)

(52) U.S. Cl.
CPC ............ *H04L 41/147* (2013.01); *H04L 67/16* (2013.01); *H04L 41/0869* (2013.01);
(Continued)

(58) Field of Classification Search
CPC ............. H04L 41/0866; H04L 41/5035; H04L 41/145; H04L 41/0873; H04L 41/0869; G06F 3/061; G06F 3/0653
See application file for complete search history.

(56) References Cited

U.S. PATENT DOCUMENTS

| 6,836,750 B2 * | 12/2004 | Wong .................. G06F 11/0709 702/183 |
| 7,752,287 B2 * | 7/2010 | Routray .............. H04L 41/5035 706/12 |

(Continued)

FOREIGN PATENT DOCUMENTS

| JP | 2006-107080 A | 4/2006 |
| WO | 2010/089804 A1 | 8/2010 |

OTHER PUBLICATIONS

International Search Report of PCT/JP2015/077692 dated Nov. 10, 2015.

*Primary Examiner* — Tom Y Chang
(74) *Attorney, Agent, or Firm* — Mattingly & Malur, PC

(57) ABSTRACT

The difference in operational management service among a plurality of storage apparatuses is detected by an apparatus that provides at least one operational management service to the storage apparatuses of a plurality of user sites via a communication network. The apparatus classifies the storage apparatuses of the plurality of user sites on the basis of use statuses, and generate at least one group including the plurality of storage apparatuses; and a service difference extraction unit configured to detect, out of the plurality of storage apparatuses that constitute the group, a first storage device that is inferior in terms of a predetermined index and a second storage device that is superior to the first storage device in terms of the predetermined index, and extract a difference between a first operational management service applied to the first storage apparatus and a second opera- (Continued)

tional management service applied to the second storage apparatus.

13 Claims, 20 Drawing Sheets

(52) U.S. Cl.
CPC ........ *H04L 41/0873* (2013.01); *H04L 41/145* (2013.01); *H04L 41/5035* (2013.01); *H04L 67/1097* (2013.01)

(56) References Cited

U.S. PATENT DOCUMENTS

| | | | | |
|---|---|---|---|---|
| 7,779,122 B2* | 8/2010 | Butler | ............... | H04L 41/08 382/240 |
| 8,499,063 B1* | 7/2013 | Satish | ............... | G06F 8/62 709/220 |
| 8,935,493 B1* | 1/2015 | Dolan | ............... | G06F 3/0649 711/117 |
| 9,330,362 B2* | 5/2016 | Bilenko | ............... | G06N 20/00 |
| 9,389,889 B2* | 7/2016 | Kimura | ............... | G06F 9/4552 |
| 9,485,615 B2* | 11/2016 | Wang | ............... | H04L 67/1061 |
| 9,898,393 B2* | 2/2018 | Moorthi | ............... | G06F 11/368 |
| 10,255,124 B1* | 4/2019 | Bellingan | ............... | G06F 11/0709 |
| 2005/0086331 A1* | 4/2005 | Wadia | ............... | H04L 41/145 709/221 |
| 2005/0119996 A1* | 6/2005 | Ohata | ............... | G06F 11/3495 |
| 2005/0188116 A1* | 8/2005 | Brown | ............... | G06F 9/44505 710/8 |
| 2005/0234931 A1* | 10/2005 | Yip | ............... | H04L 41/0816 |
| 2006/0075292 A1 | 4/2006 | Fukui | | |
| 2006/0174238 A1* | 8/2006 | Henseler | ............... | G06F 8/63 717/168 |
| 2006/0190714 A1* | 8/2006 | Vaszary | ............... | G06F 9/5083 713/100 |
| 2007/0300103 A1* | 12/2007 | Verbowski | ............... | G06F 11/0748 714/37 |
| 2011/0307728 A1* | 12/2011 | Hatasaki | ............... | G06F 1/3215 713/323 |
| 2012/0046999 A1* | 2/2012 | Jayarannan | ............... | G06Q 10/06393 705/7.39 |
| 2012/0232947 A1* | 9/2012 | McLachlan | ............... | G06Q 10/06 705/7.23 |
| 2014/0046638 A1* | 2/2014 | Peloski | ............... | G06F 17/5009 703/6 |
| 2014/0082423 A1* | 3/2014 | Kudo | ............... | G06F 11/079 714/37 |
| 2015/0172120 A1* | 6/2015 | Dwarampudi | ............... | H04L 67/1097 709/221 |
| 2015/0286409 A1* | 10/2015 | Chandra | ............... | G06F 3/0604 711/170 |
| 2015/0379429 A1* | 12/2015 | Lee | ............... | G09B 5/00 706/11 |
| 2016/0085883 A1* | 3/2016 | Shiraishi | ............... | G06F 17/504 703/1 |
| 2016/0196496 A1* | 7/2016 | Chatterjee | ............... | G06F 9/5005 706/47 |
| 2017/0031671 A1* | 2/2017 | Joshi | ............... | G06F 8/654 |
| 2017/0053011 A1* | 2/2017 | Alatorre | ............... | G06F 16/283 |
| 2017/0063654 A1* | 3/2017 | Acuna | ............... | H04L 43/08 |
| 2017/0235512 A1* | 8/2017 | Ruchita | ............... | G06F 3/0604 711/170 |
| 2017/0323000 A1* | 11/2017 | Alatorre | ............... | G06F 16/283 |

* cited by examiner

[Fig. 1]
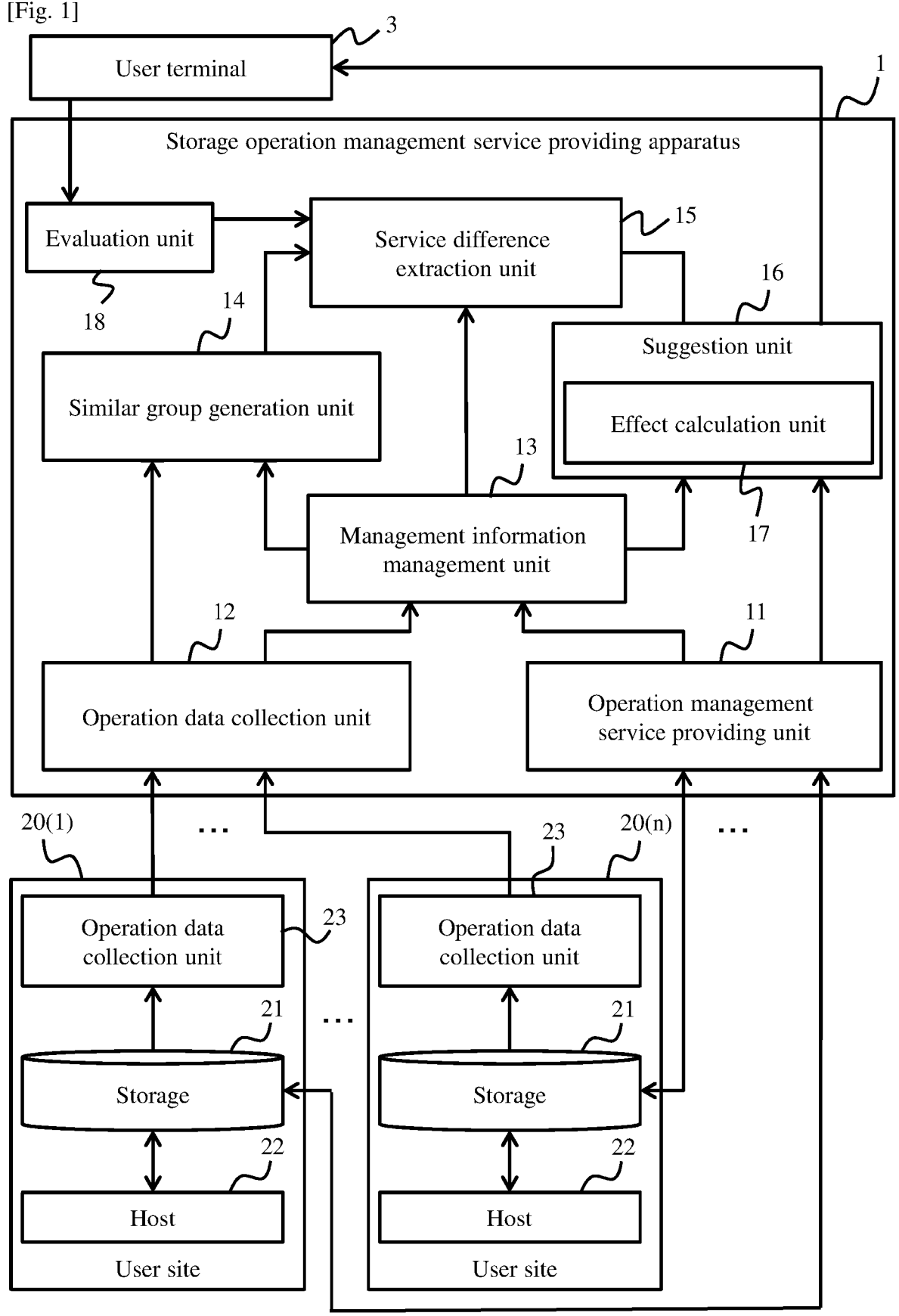

[Fig. 2]
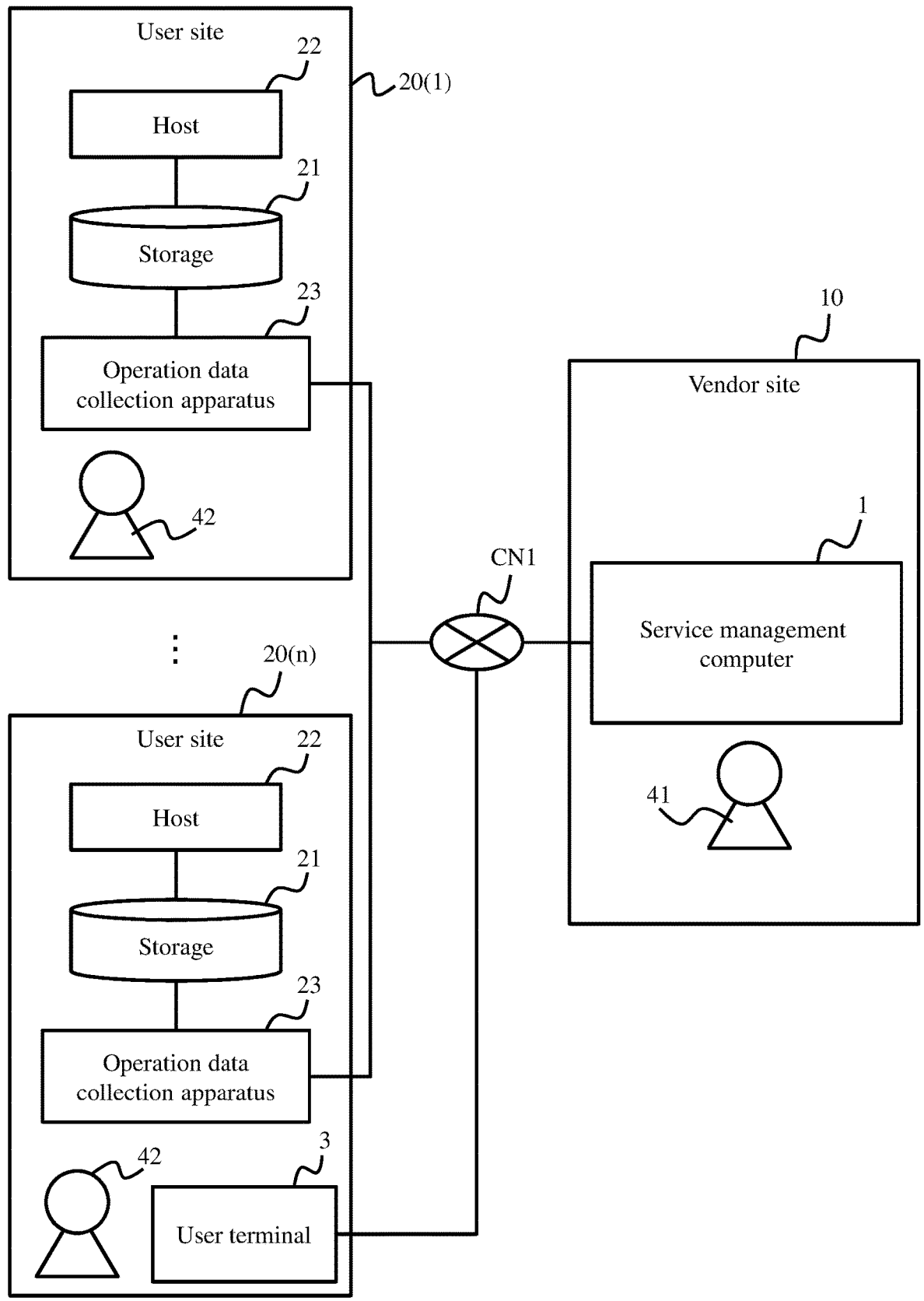

[Fig. 3]
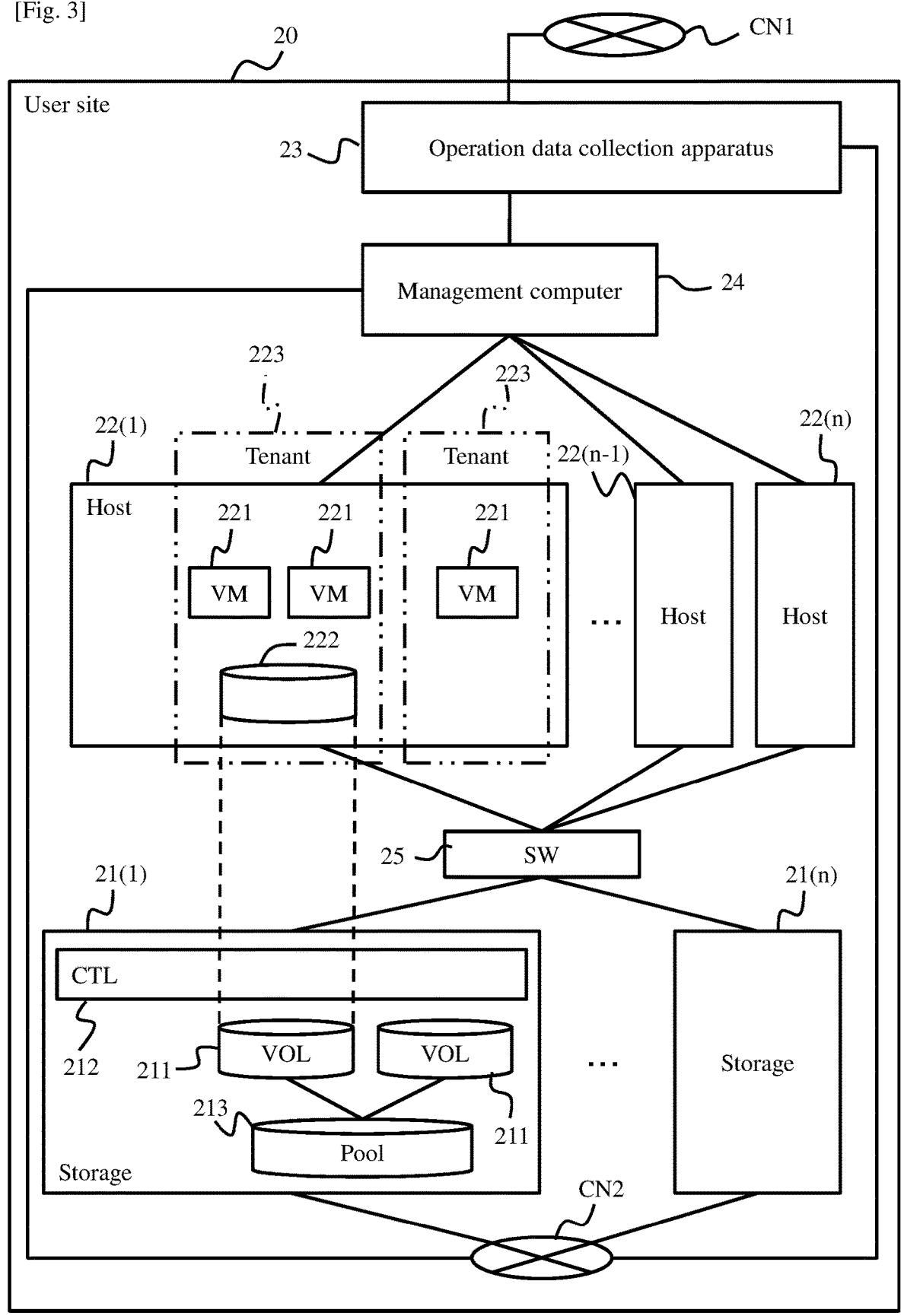

[Fig. 4]
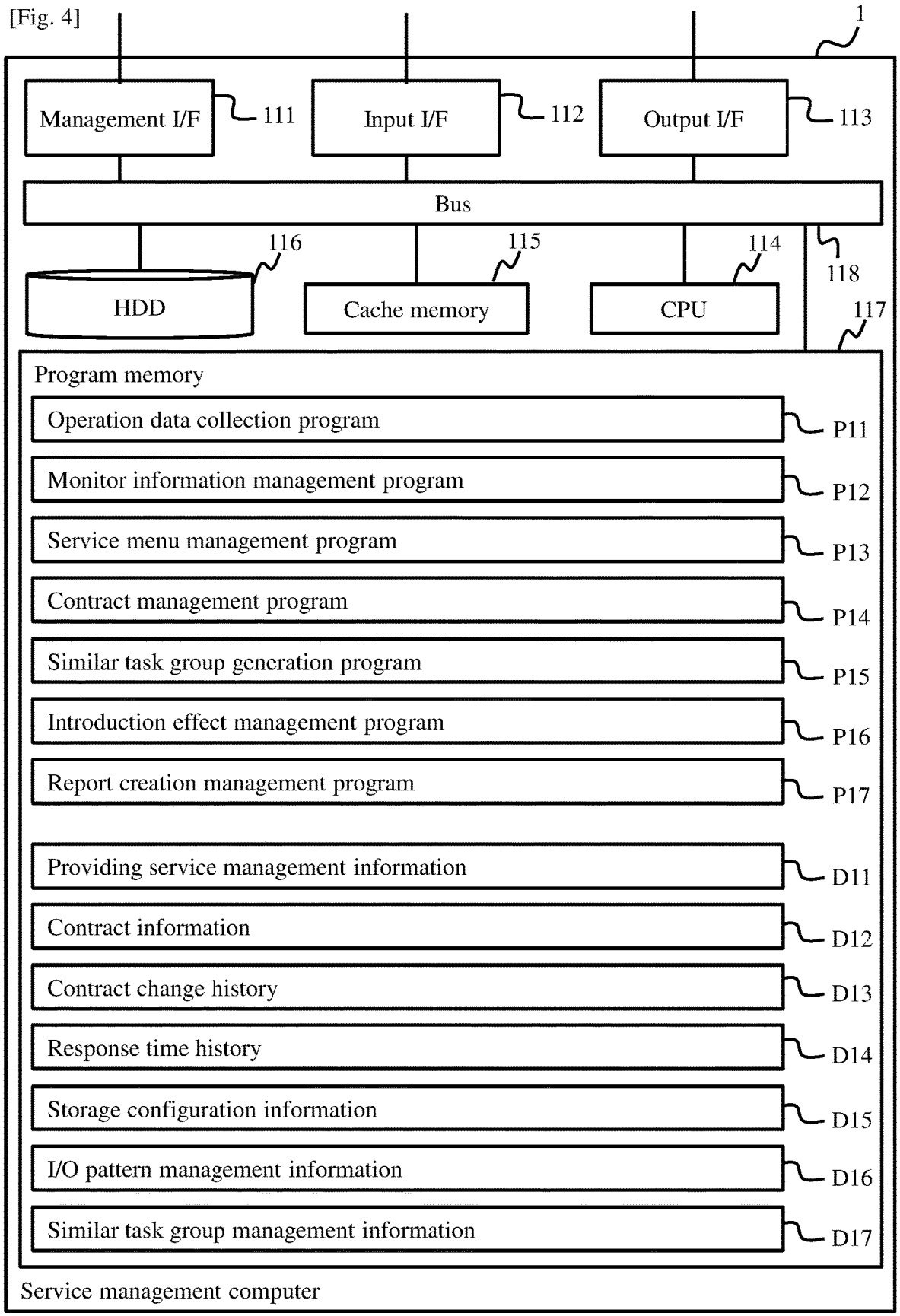

[Fig. 5]

Providing service management information D11

| Category | Index | Service menu | Content | | Paid function and service |
|---|---|---|---|---|---|
| | | | Report | Tuning | |
| | | | | | C115 |
| | C112 | C113 | C114 | | |
| C111 | | | | | |
| Performance | Response time | Performance monitor and analysis | Yes | Null | Null |
| | | Data migration | Yes | TX11(1) | TX11(2) |
| | | I/O performance guarantee | Yes | TX11(3) | TX11(4) |
| | | Add disk | Yes | Null | Null |
| | | Temporary resource borrowing | Yes | Null | TX11(5) |
| Cost | Average IOPS/disk cost | Data migration | Yes | Null | Null |
| | | I/O performance guarantee | Yes | TX11(6) | TX11(7) |
| | | ... | ... | ... | ... |
| Availability | RTO | Periodic backup | Yes | TX11(8) | TX11(9) |
| | | ... | ... | ... | ... |
| ... | ... | ... | | | |

[Fig. 6]

Contract information D12

| User ID (C121) | Storage ID (C122) | Providing service (C123) | Disclosure appropriateness of operation data (C124) |
|---|---|---|---|
| UA | SA | Performance monitoring and analysis service | Yes |
| | SB | I/O performance guaranteeing service | No |
| UB | SC | I/O performance guaranteeing service | Yes |
| UC | SD | Performance monitoring and analysis service | Yes |
| UD | SE | Data migration service | No |
| ... | ... | ... | ... |

[Fig. 7]

| \multicolumn{3}{c}{Contract change history  D13} | | |
|---|---|---|
| User ID (C131) | Contract renewal date (C132) | Contract content (C133) |
| UA | 2014/04/01 | Performance monitoring and analysis service |
| UB | 2014/04/01 | Performance monitoring and analysis service |
|  | 2014/10/01 | Data migration service |
|  | 2015/02/01 | I/O performance guaranteeing service |
| ... | ... | ... |

[Fig. 8]

Response time history D14

| User ID (C141) | Storage ID (C142) | Acquisition period (C143) | Response time (C144) | Alarm flag (C145) |
|---|---|---|---|---|
| UB | SC | 2014/11 | 5 ms | On |
| | | 2014/12 | 4 ms | On |
| | | 2015/01 | 4 ms | On |
| | | 2015/02 | 1 ms | Null |
| | | 2015/03 | 1 ms | Null |
| | ⋮ | ⋮ | ⋮ | ⋮ |
| ⋮ | ⋮ | ⋮ | ⋮ | ⋮ |

[Fig. 9]

Storage configuration information D15

| User ID | Apparatus information C152 | | Disk performance limit [IOPS] C153 | FM [TB] C154 | Paid function and service C155 |
|---|---|---|---|---|---|
| | Storage ID C151 | Type | | | |
| UA | SA | Type 1 | 50,000 | 5 | Remote copy function<br>Layer control function<br>Inter-pool volume migration function |
| | SB | Type 2 | 80,000 | 20 | Layer control function<br>Inter-pool volume migration function<br>Processor allocation changing function |
| UB | SC | Type 1 | 40,000 | 5 | Layer control function<br>Inter-pool volume migration function |
| UC | SD | Type 3 | 10,000 | 0 | Null |
| UD | SE | Type 2 | 100,000 | 10 | Layer control function<br>Inter-pool volume migration function<br>Processor allocation changing function<br>Cloud service |
| ... | ... | ... | ... | ... | ... |

[Fig. 10]

| I/O pattern management information D16 | | | | | | | | |
|---|---|---|---|---|---|---|---|---|
| C161 | C162 | C163 | C164 | C165 | C166 | | | |
| User ID | Storage ID | number of I/Os | I/O change rate | Representative pattern | I/O pattern [%] | | | |
| | | | | | RR | RW | SR | SW |
| UA | SA | 10,000 | +20% | RW (Random Write) | 0 | 100 | 0 | 0 |
| | SB | 2,000 | +5% | RR (Random Read) | 67 | 33 | 0 | 0 |
| UB | SC | 12,000 | +30% | RW (Random Write) | 0 | 100 | 0 | 0 |
| UC | SD | 2,000 | 0% | SW (Sequential Write) | 0 | 0 | 0 | 100 |
| UD | SE | 200 | -20% | SR (Sequential Read) | 0 | 0 | 100 | 0 |
| ... | ... | ... | ... | ... | ... | ... | ... | ... |

[Fig. 11]

| Similar task group management information  D17 |||
|---|---|---|
| C171 | C172 | C173 |
| User ID | Storage ID | Group ID |
| UA | SA | Group RW-1 |
|  | SB | Group RR-3 |
| UB | SC | Group RW-1 |
| UC | SD | Group SW-1 |
| UD | SE | Group SR-5 |
| ... | ... | ... |

[Fig. 12]
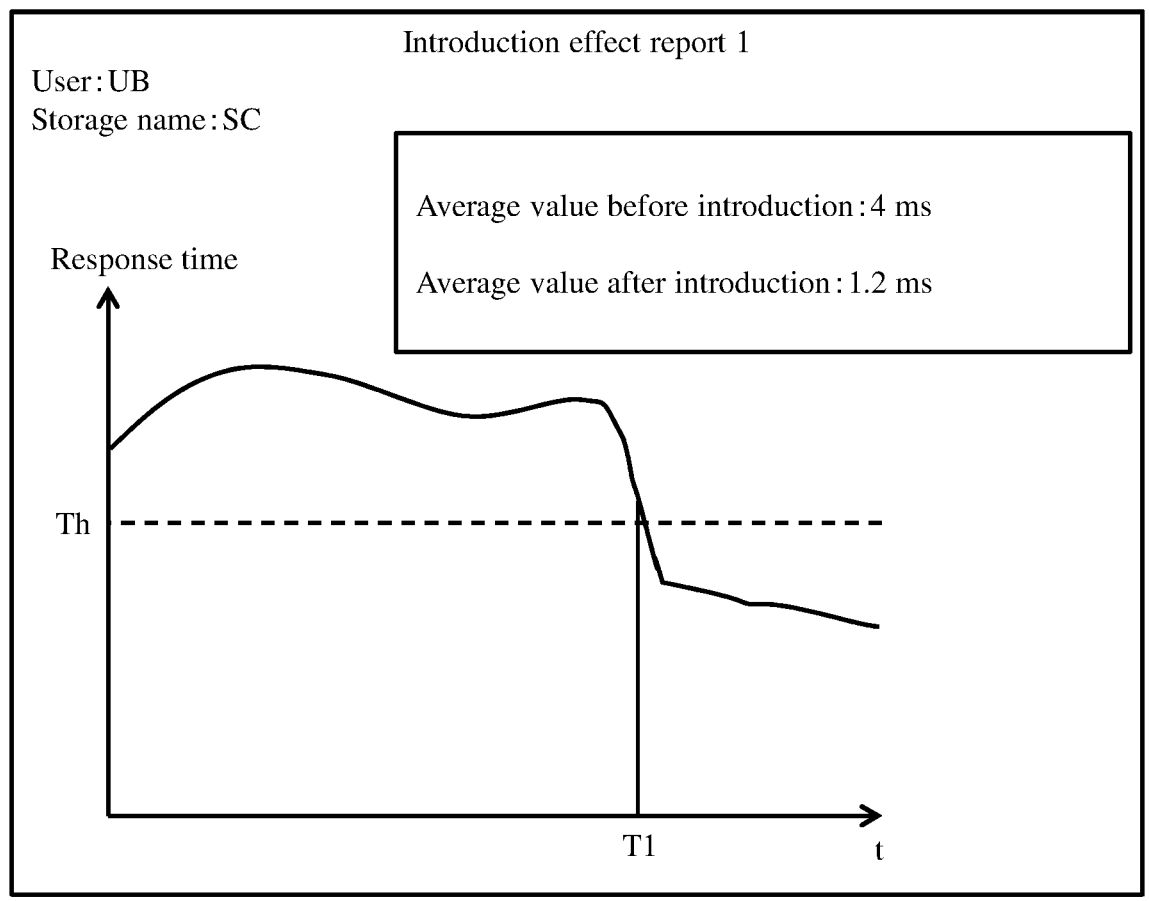

[Fig. 13]
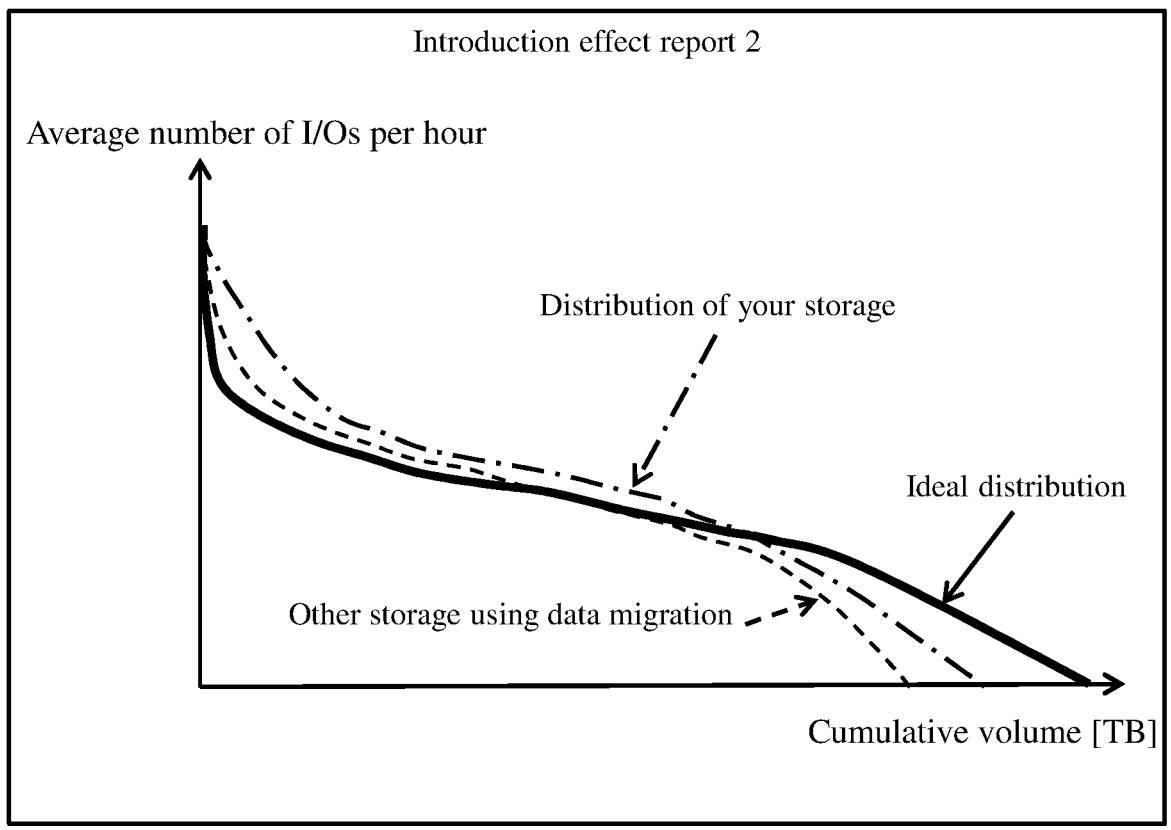

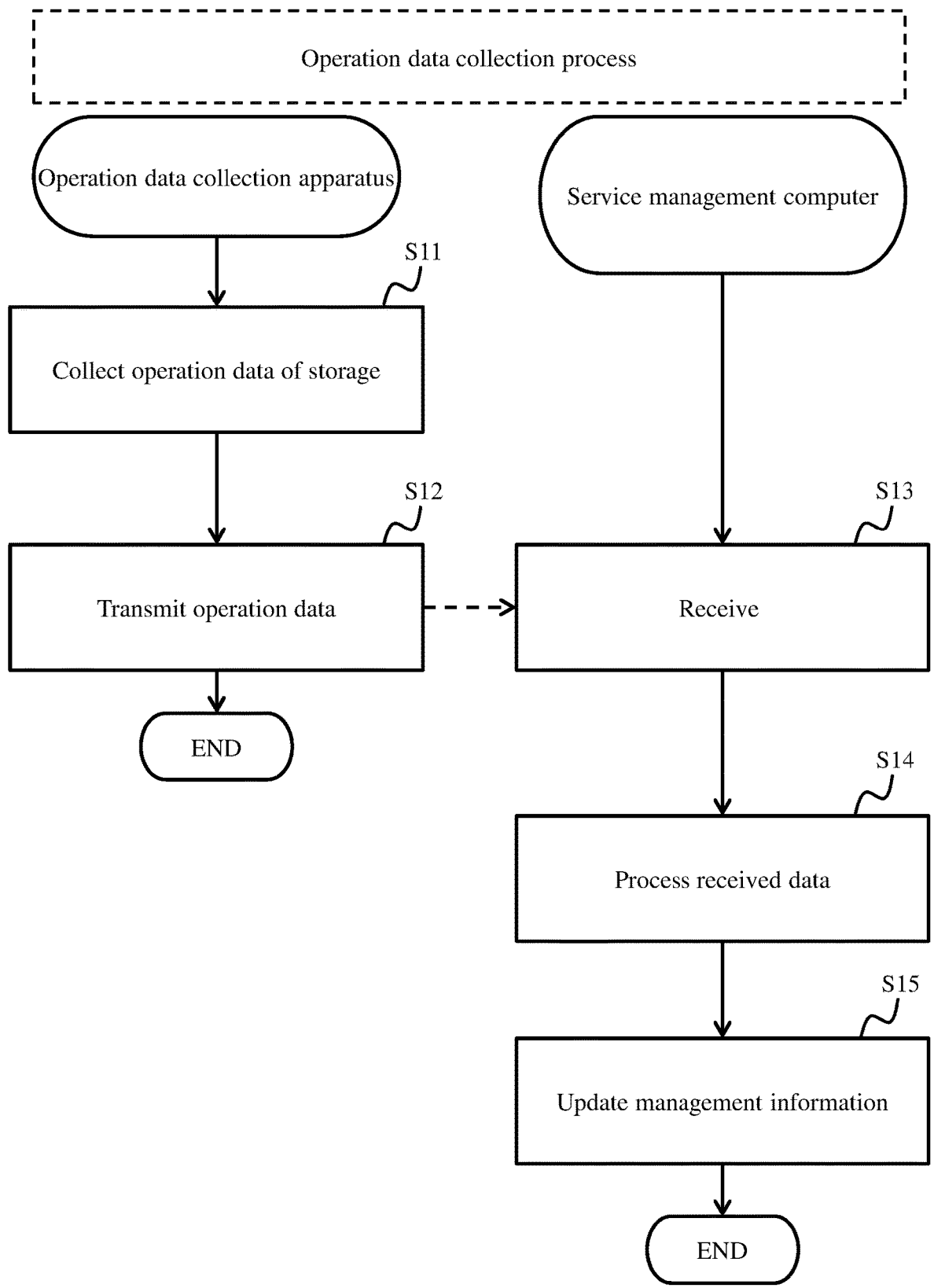
[Fig. 14]

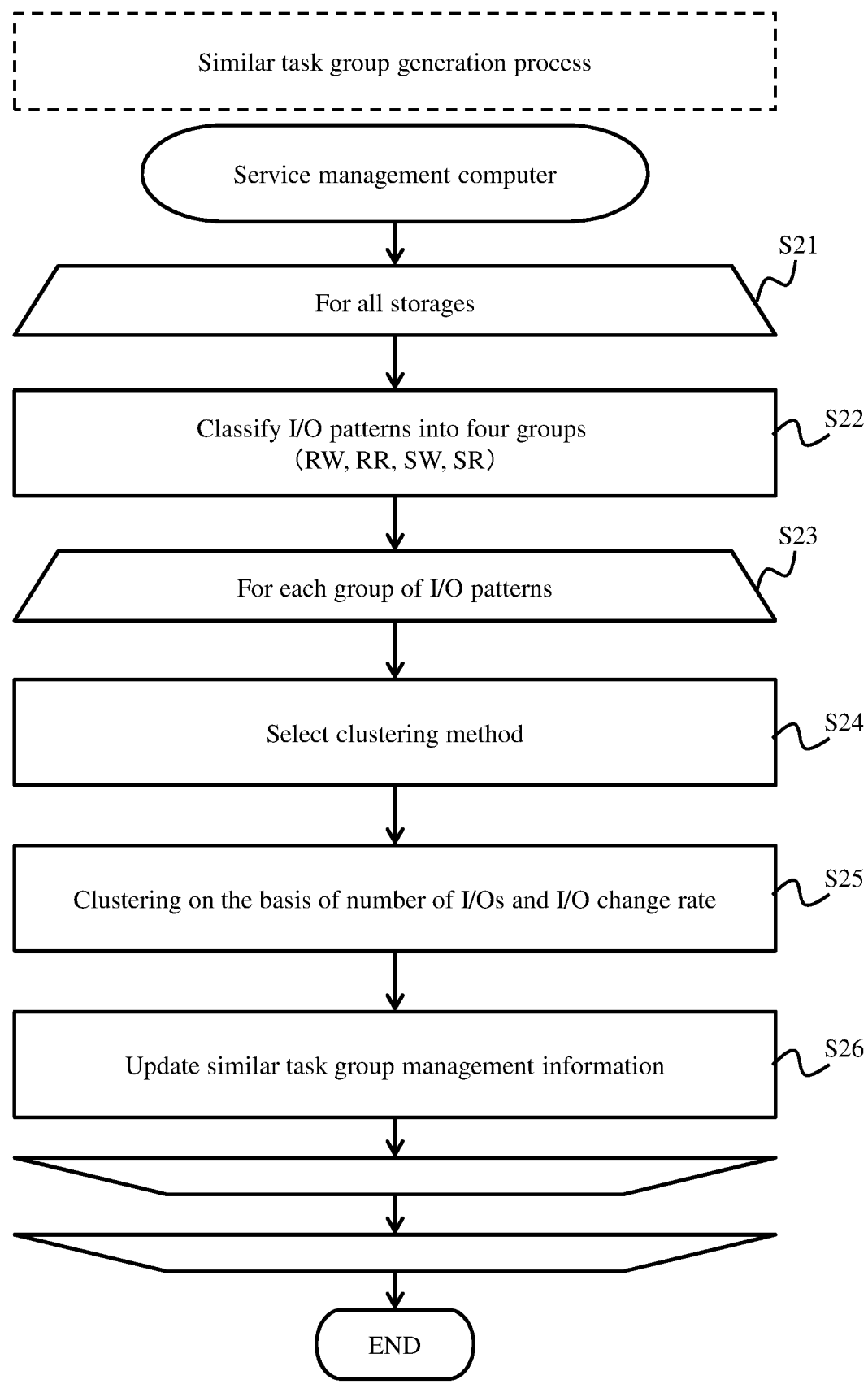
[Fig. 15]

[Fig. 16]
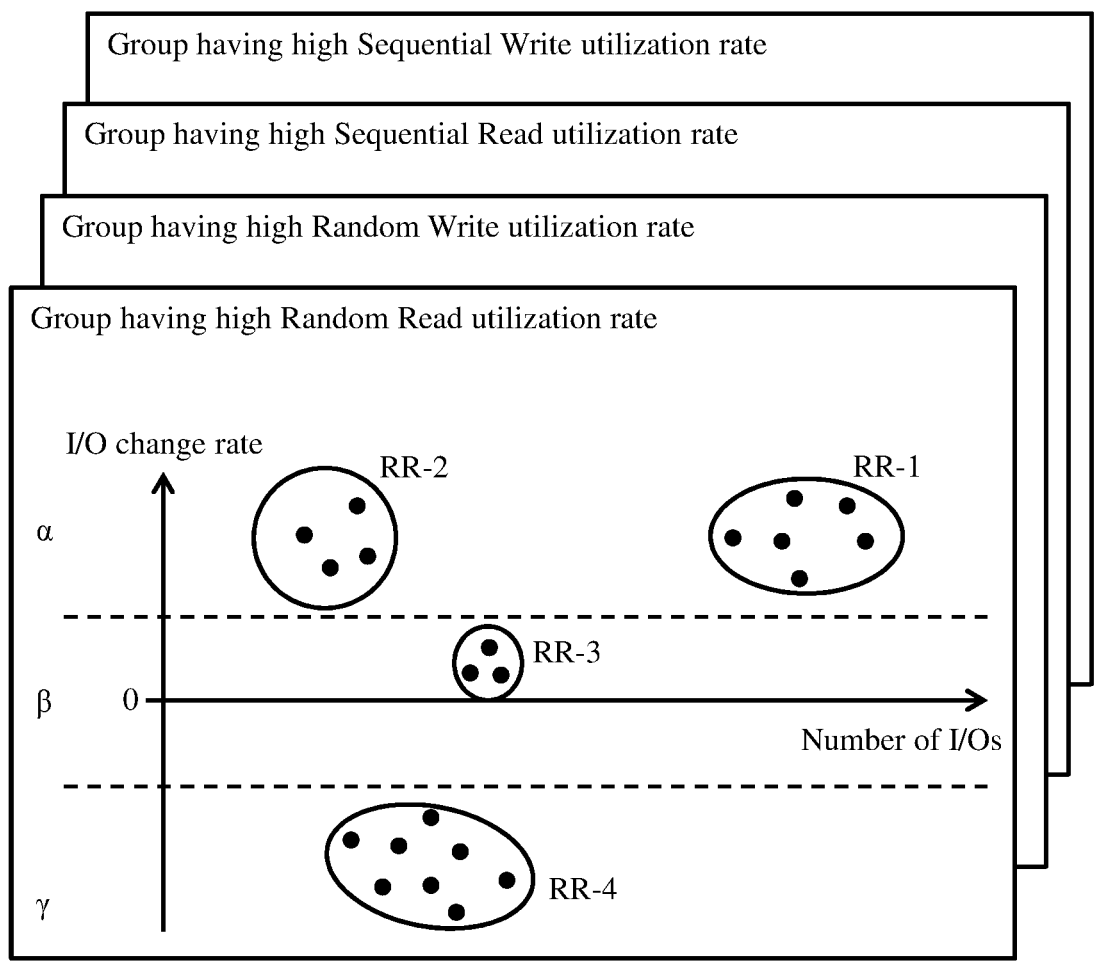

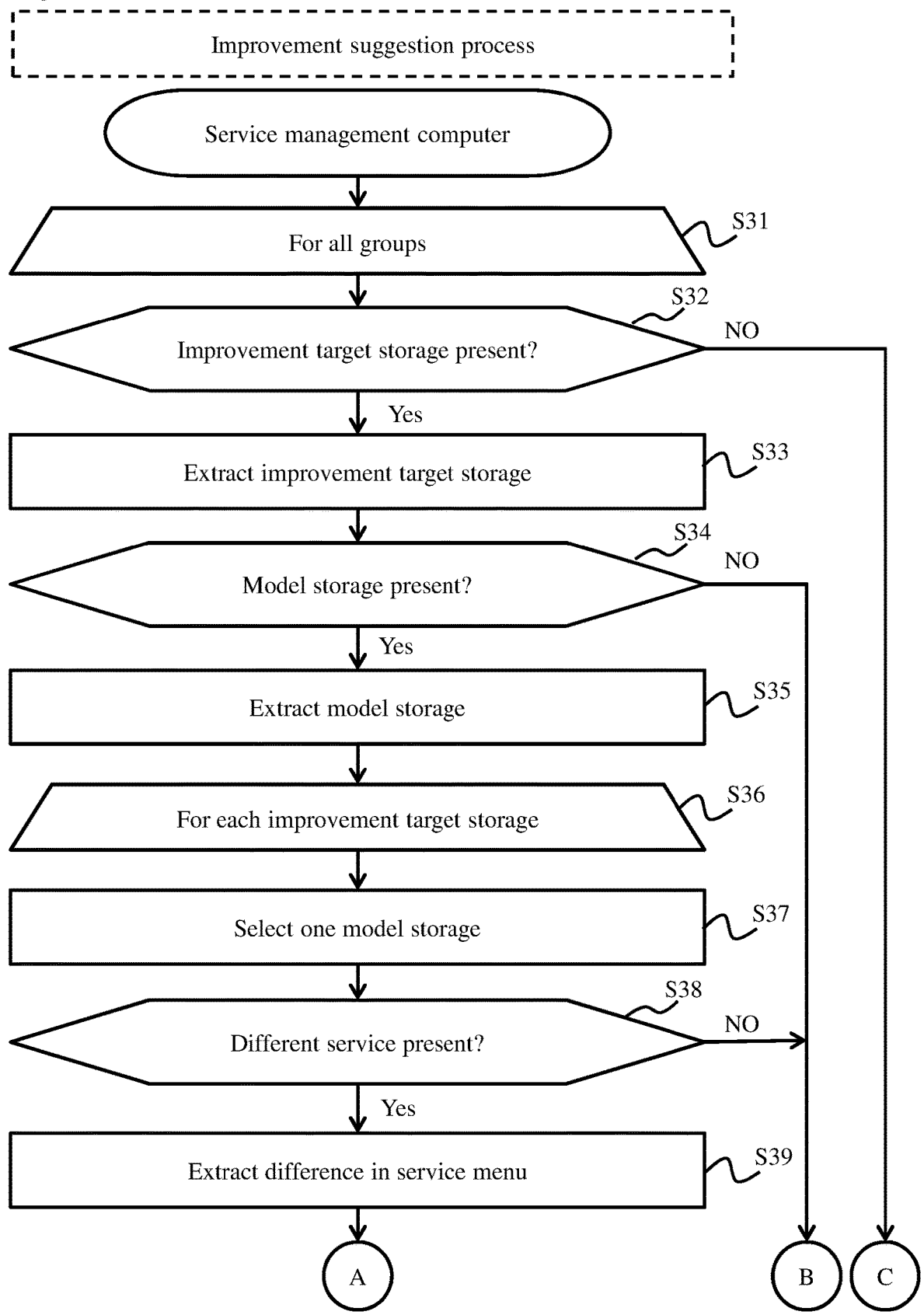
[Fig. 17]

[Fig. 18]
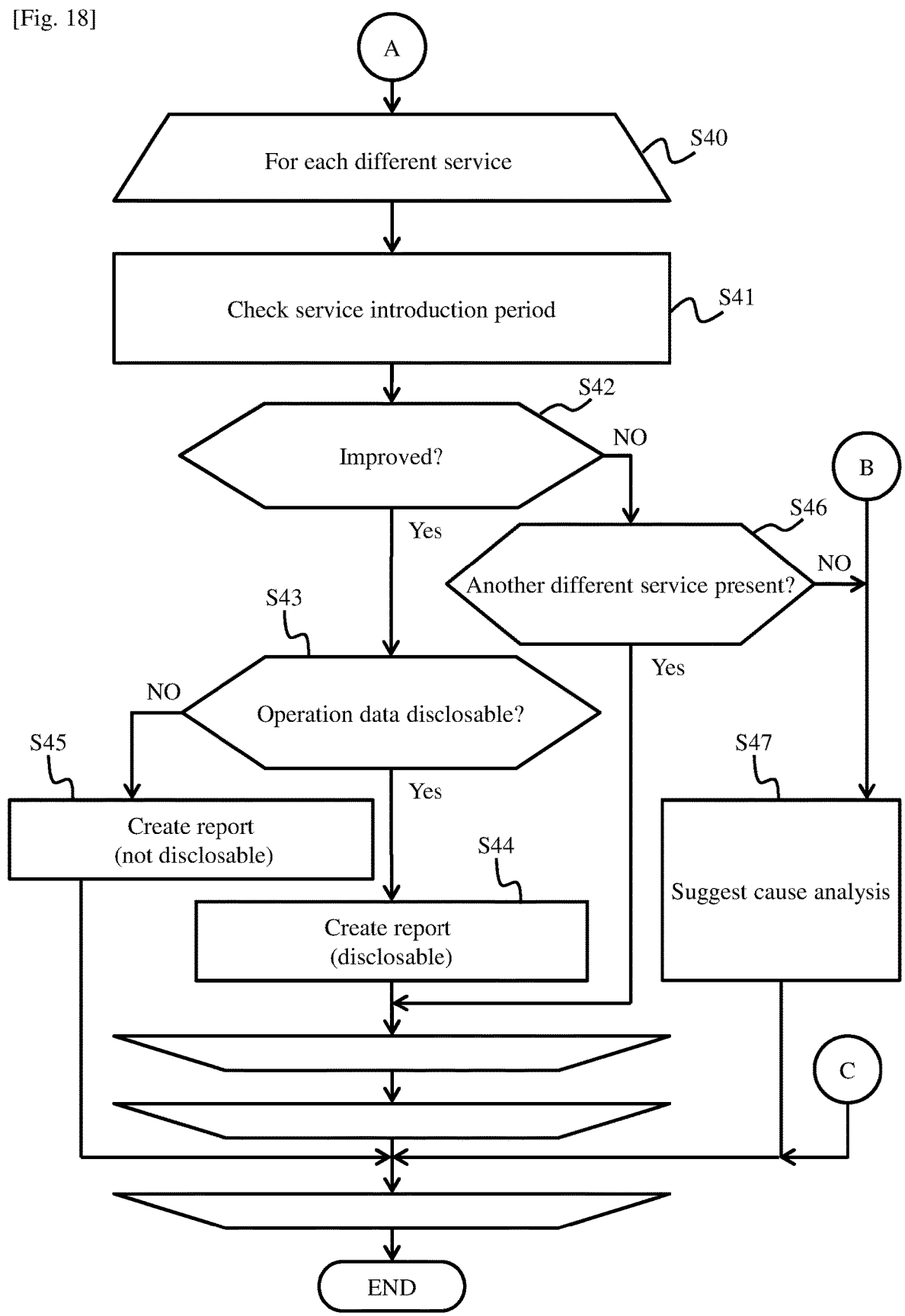

[Fig. 19]
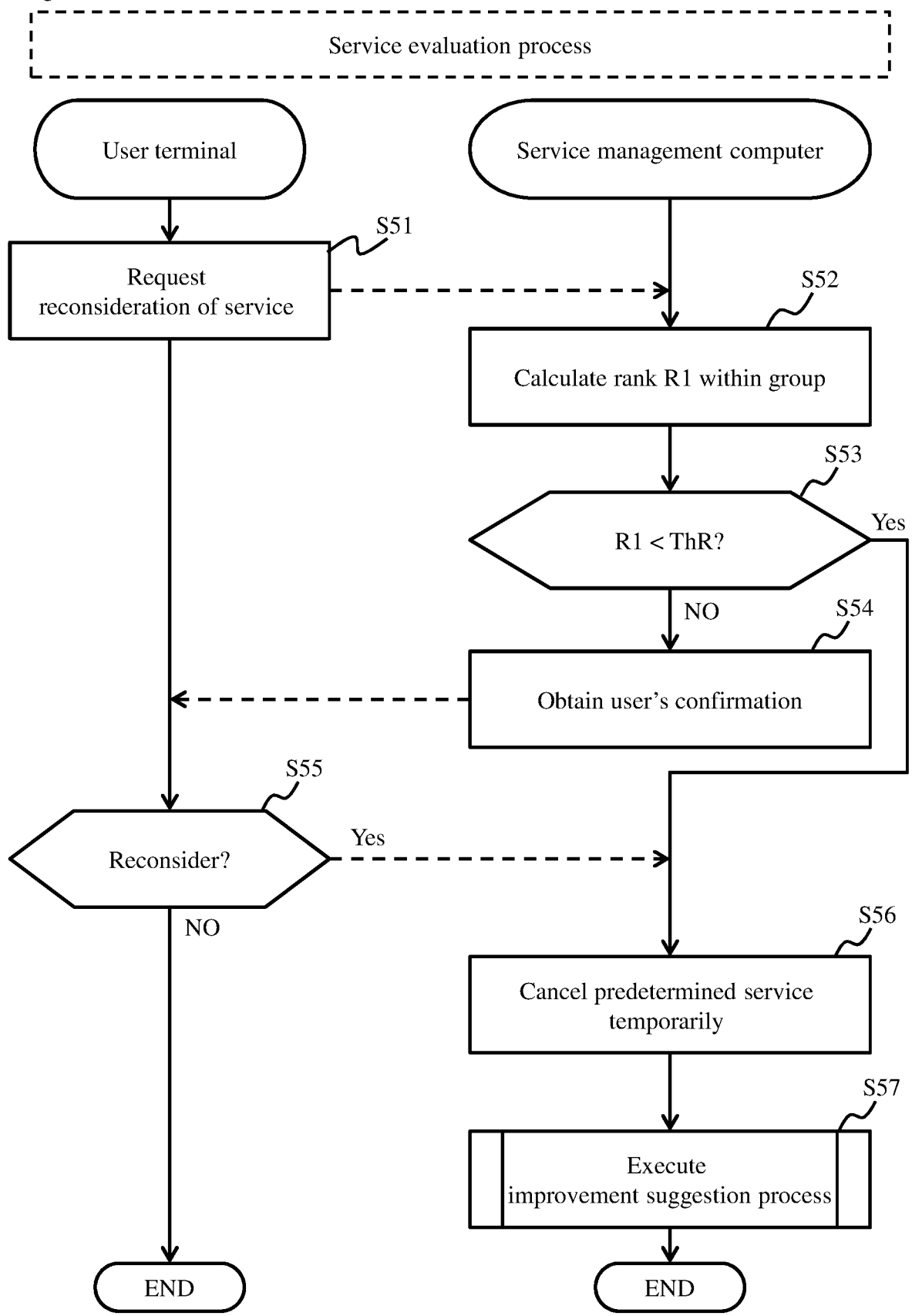

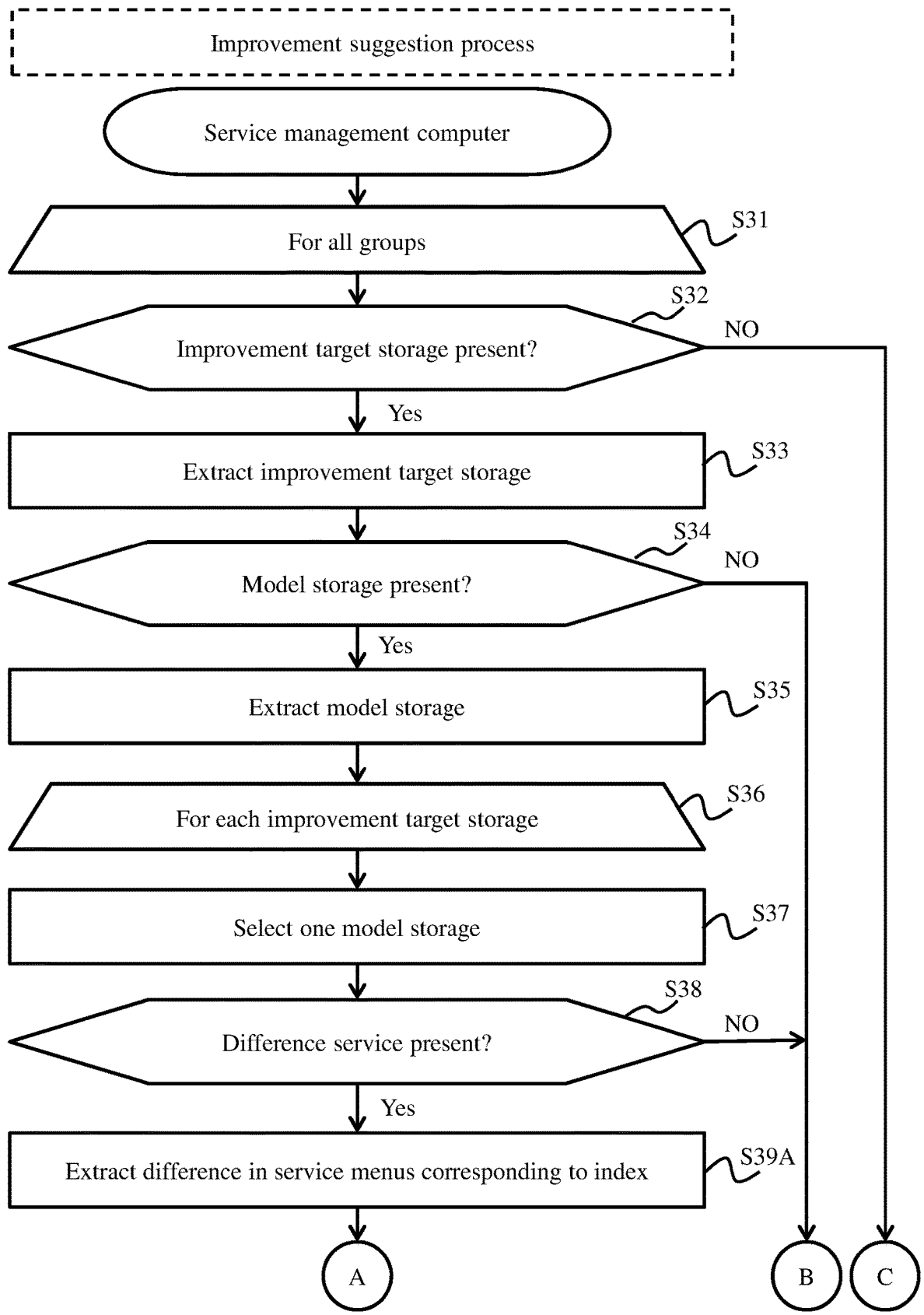
[Fig. 20]

STORAGE OPERATIONAL MANAGEMENT SERVICE PROVIDING APPARATUS, STORAGE OPERATIONAL MANAGEMENT SERVICE PROVIDING METHOD, AND STORAGE OPERATIONAL MANAGEMENT SYSTEM

TECHNICAL FIELD

The present invention relates to a storage operational management service providing apparatus, a storage operational management service providing method, and a storage operational management system.

BACKGROUND ART

A so-called cloud service that provides services or IT (Information Technology) resources operating on a server to users via a communication network is widespread. Storage of highly confidential data, execution of applications which require real-time responses, and the like are not suitable for a cloud node service. In contrast, there is a market demand that a storage apparatus management task is executed by a cloud service and an expense is paid depending on the degree of usage of the management task. In order to comply with this market demand, a service that provides management software as SaaS (Software as a Service) and undertakes a part of an operational management task has been developed.

PTL 1 discloses a technique in which a service operator monitors a so-called on-premise storage owned and operated by a user via a communication network and performs a maintenance task such as a setting changing task or a disk replacement task when an event occurs.

PTL 2 discloses a technique of monitoring a performance of an on-premise storage and presenting a performance improvement plan on the basis of configuration information and operation information of the storage.

CITATION LIST

Patent Literature

[PTL 1]
P 2006-107080A
[PTL 2]
WO 2010/089804

SUMMARY OF INVENTION

Technical Problem

In the related art, since an operational management service is provided to users in one-to-one correspondence, it is impossible to compare the application states of operational management services to a plurality of users. Therefore, users have to set a threshold value, an initial value, and the like for managing storages by trial and error on the basis of user's kill and experience and the use state of storages, and hence, the usability is poor.

Even if one user has a chance to know a storage management method of the other user, if the type of a task executed by a storage managed by the other user is different from the type of a task executed by a storage managed by the one user, the storage management method of the other user is not helpful to the one user.

The present invention has been made in view of the problems, and an object thereof is to provide a storage operational management service providing apparatus, a storage operational management service providing method, and a storage operational management system capable of detecting a difference in operational management services among a plurality of storage apparatuses. Another object of the present invention is to provide a storage operational management service providing apparatus, a storage operational management service providing method, and a storage operational management system capable of presenting a difference in application states of operational management services among a plurality of storage apparatuses in the same group, classified on the basis of a use state and improving the usability.

Solution to Problem

In order to solve the problem, a storage operational management service providing apparatus according to the present invention is a storage operational management service providing apparatus that provides at least one operational management service to storage apparatuses of a plurality of user sites via a communication network, the apparatus including: a group generation unit configured to classify the storage apparatuses of the plurality of user sites on the basis of use states and generate at least one group including the plurality of storage apparatuses; and a service difference extraction unit configured to detect, out of the plurality of storage apparatuses that constitute the group, a first storage apparatus that is inferior in terms of a predetermined index and a second storage apparatus that is superior to the first storage apparatus in terms of the predetermined index and extract a difference between a first operational management service applied to the first storage apparatus and a second operational management service applied to the second storage apparatus.

Advantageous Effects of Invention

According to the present invention, it is possible to extract a difference in application states of operational management services among storage apparatuses which are inferior or superior to each other in terms of a predetermined index within a group classified on the basis of the use state. As a result, it is possible to determine whether an operational management service applied to a storage apparatus is appropriate on the basis of the difference in operational management services, and the usability is improved.

BRIEF DESCRIPTION OF DRAWINGS

FIG. 1 is a block diagram illustrating an outline of an entire system including a storage operational management service providing apparatus.

FIG. 2 is a configuration diagram of a system including the storage operational management service providing apparatus.

FIG. 3 is a configuration diagram of a user site.

FIG. 4 is a configuration diagram of a service management computer as an example of the "storage operational management service providing apparatus".

FIG. 5 is a configuration diagram of information for managing an operational management service that a service management computer provides a storage apparatus of a user site.

FIG. 6 is a configuration diagram of information for managing an operational management service contracted by users.

FIG. 7 is a configuration diagram of information for managing a contract change history.

FIG. 8 is a configuration diagram of information for managing a response time history of a storage apparatus.

FIG. 9 is a configuration diagram of information for managing configuration information of a storage apparatus.

FIG. 10 is a configuration diagram of information for managing an I/O pattern of a storage apparatus.

FIG. 11 is a configuration diagram of information for managing a similar task group to which a storage apparatus belongs.

FIG. 12 is an explanatory diagram illustrating an example of an introduction effect report illustrating the effects obtained when a new application management service is introduced.

FIG. 13 is an explanatory diagram illustrating another example of the introduction effect report.

FIG. 14 is a flowchart illustrating a process of a service management computer acquiring operation data from a storage apparatus.

FIG. 15 is a flowchart illustrating a process of generating similar task groups.

FIG. 16 is an explanatory diagram illustrating an example of generating similar task groups.

FIG. 17 is a flowchart illustrating a process of suggesting an operational management service to be applied to a storage apparatus.

FIG. 18 is a flowchart continued from FIG. 17.

FIG. 19 is a flowchart illustrating a process of evaluating an operational management service being applied to a storage apparatus according to an instruction from a user according to a fourth embodiment.

FIG. 20 is a flowchart illustrating a portion of a process of suggesting an operational management service according to a fifth embodiment.

DESCRIPTION OF EMBODIMENTS

Hereinafter, embodiments of the present invention will be described with reference to the drawings. As will be described later, in the present embodiment, by comparing an operational management service being applied to an improvement target storage apparatus with an operational management service being applied to a storage apparatus which operates properly, an operational management service that is suitable for the improvement target storage apparatus is presented.

A service management computer 1 which is an example of a "storage operational management service providing apparatus" categorizes operational management services to be applied to a storage apparatus 21 by a pursuing value (effect). In the service management computer 1, an index for evaluating the effect obtained when an operational management service was applied is prepared for each category.

The service management computer 1 monitors the use states of the respective storage apparatuses 21 which are under management and collects operation data from the respective storage apparatuses 21. The service management computer 1 classifies the respective storage apparatuses into similar task groups on the basis of the operation data. For example, the service management computer 1 groups storage apparatuses having similar I/O patterns, numbers of I/Os, or I/O change rates as a group having a similar task and scale.

The service management computer 1 extracts a first storage apparatus for which improvement is necessary in terms of a predetermined index and a second storage apparatus that is superior to the first storage apparatus within the same group. The service management computer 1 extracts a difference between a first operational management service being applied to the first storage apparatus and a second operational management service being applied to the second storage apparatus.

The service management computer 1 can present a difference operational management service (a predetermined operational management service) which is included in the second operational management service and is not included in the first operational management service to a user who is an operator of the second storage apparatus.

When there are a plurality of second storage apparatuses superior to the first storage apparatus in terms of the predetermined index, the service management computer 1 selects a second storage apparatus of which the configuration or the user's requirements are most similar to the first storage apparatus as a comparison target. The service management computer 1 calculates an effect obtained when a predetermined operational management service is applied to the second storage apparatus and presents the predetermined operational management service when the calculated effect is equal to or larger than a predetermined value.

The user of the first storage apparatus can determine whether the predetermined operational management service is to be applied to the first storage apparatus on the basis of the effect obtained when the predetermined operational management service is applied to the second storage apparatus only. In this way, according to the present embodiment, it is possible to suggest an operational management service appropriate to an operation state of the user, and the usability is improved.

The service management computer 1 detects the use states of the respective storage apparatuses from the operation data and classifies the respective storage apparatuses. Therefore, the service management computer 1 can suggest an operational management service appropriate to the operation of the user on the basis of the limited information called the operation data obtained from the storage apparatus 21. In this way, the user can receive a suggestion for an appropriate operational management service without disclosing information on an actual execution state of a certain task, and the usability is improved further.

Embodiment 1

FIG. 1 is an explanatory diagram illustrating an outline of an entire storage operational management system. A storage operational management service providing apparatus 1 corresponds to a service management computer 1 to be described later. In FIG. 1, the storage operational management service providing apparatus 1 will be referred to as a service providing apparatus 1.

The service providing apparatus 1 provides at least one operational management service to a plurality of storage apparatuses 21 distributed to a plurality of user sites 20(1) to 20(n). The plurality of user sites will be referred to as a user site 20 when the user sites are not distinguished particularly. The user site 20 includes at least one storage apparatus 21, at least one host computer (Host in the drawing) 22, and at least one operation data collection unit 23.

The host 22 has an application program mounted thereon and implements the function of the application program by reading and writing data from and to the storage apparatus 21. The configuration of the storage apparatus 21 and the host 22 will be described later. The operation data collection unit 23 collects operation data regularly or irregularly from the storage apparatus 21 and transmits the operation data to the service providing apparatus 1. The operation data collection unit 23 may collect the operation data and transmit the operation data to the service providing apparatus 1 voluntarily and may collect the operation data and transmit the operation data to the service providing apparatus 1 according to a request from the service providing apparatus 1.

The service providing apparatus 1 includes, for example, an operational management service providing unit 11, an operation data collection unit 12, a management information management unit 13, a similar group generation unit 14, a service difference extraction unit 15, a suggestion unit 16, an effect calculation unit 17, and an evaluation unit 18.

The operational management service providing unit 11 provides a service for managing the operation of the storage apparatus 21. Examples of the operational management service include a performance monitoring and analysis service for monitoring and analyzing the performance of the storage apparatus 21, a data migration service for optimizing a data arrangement destination among a plurality of storage layers, an I/O performance guaranteeing service, a service for borrowing computation resources of the service management computer 1, a service for adding a physical storage device to the storage apparatus 21, and a service for backing up the data stored in the storage apparatus 21. The operational management service providing unit 11 corresponds to a service menu management program P13 to be described later in FIG. 4.

The operation data collection unit 12 collects the operation data of the storage apparatus 21 from the operation data collection unit 23 of each user site 20. The management information management unit 13 generates and manages management information on the basis of the operation data collected from the operation data collection unit 12 and the information obtained from the operational management service providing unit 11. Examples of the management information include an I/O pattern, an I/O change rate, the number of times an alarm is output because a response time exceeds a threshold value, and a contract content change history. The operation data collection unit 12 corresponds to an operation data collection program P11 to be described later in FIG. 4. The management information management unit 13 corresponds to a monitor information management program P12 to be described later in FIG. 4.

The similar group generation unit 14 which is an example of the "group generation unit" classifies the respective storage apparatuses 21 on the basis of the operation data collected by the operation data collection unit 12 and the management information managed by the management information management unit 13 and generates at least one group. As will be described later in FIG. 16, the similar group generation unit 14 roughly classifies the tasks executed by the storage apparatus 21 by respective I/O patterns and generates clusters on the basis of the number of I/Os and the I/O change rate, for example, within each I/O pattern. This group generation method is an example and another group generation method may be used. The similar group generation unit 14 corresponds to a similar task group generation program P15 to be described later in FIG. 4.

The service difference extraction unit 15 extracts a difference in application states of operational management services among the plurality of comparison target storage apparatuses 21. The service difference extraction unit 15 detects a storage apparatus 21 for which improvement is necessary and a storage apparatus 21 for which improvement is not necessary on the basis of a predetermined index and extracts a difference in operational management services applied to these storage apparatuses. The service difference extraction unit 15 compares operational management services applied to improvement target storage apparatuses 21 (first storage apparatuses) and operational management services applied to storage apparatuses 21 for which improvement is not necessary (a second storage apparatus) and extracts predetermined operational management services applied to the storage apparatuses 21 for which improvement is not necessary only. The target storage apparatus 21 for which improvement is not necessary may be referred to as a model storage apparatus. The service difference extraction unit 15 corresponds to a part of an introduction effect management program P16 to be described later in FIG. 4.

The suggestion unit 16 which is an example of the "presenting unit" presents the predetermined operational management services extracted by the service difference extraction unit 15 by transmitting the predetermined operational management services to a user terminal 3. The operational management services may be presented via an email or may be presented via a service management menu screen provided to each user. A presentation method is not particularly limited. In the following description, an expression "suggestion" is used as an example of "presentation".

The suggestion unit 16 may suggest all predetermined operational management services which are differences in application states of operational management services to the user. Alternatively, the suggestion unit 16 may suggest only a service for which an effect can be expected when the service is introduced to the improvement target storage apparatus 21 among the predetermined operational management services to the user. The effect calculation unit 17 predicts and outputs an effect obtained when the predetermined operational management service is introduced to the improvement target storage apparatus 21. For example, the effect calculation unit 17 may predict that a change in performance before and after the predetermined operational management service is introduced to the model storage apparatus 21 is the effect obtained when the predetermined operational management service is introduced to the improvement target storage apparatus 21.

The suggestion unit 16 corresponds to another part of the introduction effect management program P16 and a report creation management program P17 to be described later in FIG. 4.

The user terminal 3 is an apparatus for exchanging information between a user and the service providing apparatus 1 and is configured similarly to a personal computer, a mobile phone (including a smartphone), and a mobile information terminal, for example. The user checks the information obtained from the service providing apparatus 1 using the user terminal 3. The user may transmit an instruction and the like from the user terminal 3 to the service providing apparatus 1.

The evaluation unit 18 evaluates an operational management service applied to an evaluation target storage apparatus 21. Upon receiving an instruction to evaluate an operational management service from the user terminal 3, the evaluation unit 18 requests the start of evaluation on at least a portion of the operational management service. The evaluation unit 18 temporarily disables application of an evaluation target operational management service, for example, in order to evaluate the operational management service. The service difference extraction unit 15 finds the disabled operational management service. The effect calculation unit 17 of the suggestion unit 16 predicts an effect obtained when the disabled operational management service is applied again to the evaluation target storage apparatus 21 and presents the prediction result.

FIG. 2 illustrates an entire configuration of the storage operational management system. Hereinafter, the service providing apparatus 1 will be referred to as a service management computer 1.

In the storage operational management system, for example, at least one vendor site 10 and a plurality of user sites 20 are coupled to one another via a communication network CN1.

A storage operational management service according to the present embodiment is provided from the vendor site 10 to a user 42 of each user site 20. A plurality of user sites 20 are present and each user site 20 is operated by the user 42.

The storage operational management service may be automatically performed by the service management computer 1 or may be manually operated by a service provider 41.

The user 42 of the user site 20 can use the user terminal 3. The user 42 transmits an instruction to the service management computer 1 and checks the information provided by the service management computer 1 using the user terminal 3. In FIG. 2, although the user terminal 3 is provided in a user site 20(n) on the lower side only, the user terminal 3 may be provided in a user site 20(1) on the upper side. Alternatively, the user 42 may exchange information with the service management computer 1 via a management computer 24 or the like to be described later in FIG. 3.

The operation data of the storage apparatus 21 installed in the user site 20 is monitoring target data and is collected by an operation data collection apparatus 23 once. The operation data collection apparatus 23 in the user site 20 transmits the collected operation data to the service management computer 1 of the vendor site 10 via the communication network CN1.

FIG. 3 illustrates a configuration example of the user site 20. For example, the user site 20 includes the storage apparatus 21, the host computer 22, the operation data collection apparatus 23, the management computer 24, and a network coupling apparatus 25. As for each of these apparatuses 21 to 25, at least one apparatus is provided.

The respective storage apparatuses 21 and the respective host computers 22 are coupled with the management computer 24 via a management network CN2. Furthermore, although not illustrated in the drawing, the network coupling apparatus 25 is also coupled with the management computer 24 via the management network CN2. The management computer 24 manages the respective storage apparatuses 21, the respective host computers 22, and the network coupling apparatus 25. The respective host computers 22 and the respective storage apparatuses 21 are coupled with one another via the network coupling apparatus 25.

The operation data collection apparatus 23 is coupled with the management network CN2 and is also coupled with the communication network CN1 other than the user site. The operation data collection apparatus 23 is also coupled with the management computer 24. The operation data collection apparatus 23 may be configured as an apparatus separated from the management computer 24 or may be configured as one of the functions included in the management computer 24.

For example, the storage apparatus 21 includes a plurality of logical volumes 211 and at least one controller 212. The logical volume 211 is generated on the basis of a physical storage area having a disk (a physical storage device) such as, for example, a hard disk or a flash disc. In the present embodiment, the type of the disk is not particularly limited.

At least one of the logical volumes 211 may be formed as a so-called thin provisioning volume which uses an actual storage area in a storage pool 213 as necessary. The storage pool 213 virtualizes and manages a physical storage area included in a disk. The controller 212 allocates a physical storage area in the storage pool 213 according to a write request on the thin provisioning volume A plurality of storage pools 213 may be provided.

The storage apparatus 21 may include an ordinary logical volume instead of or together with the thin provisioning volume.

Some of the disks used by the storage apparatus 21 may not be present in the storage apparatus 21. A disk provided outside the storage apparatus 21 may be used as if the disk were present inside the storage apparatus 21.

The controller 212 controls the operation of the storage apparatus 21. The controller 212 receives a command such as a write command and a read command from the host computer 22, processes the command, and transmits the processing result to the host computer 22 that issued the command.

For example, the controller 212 includes a microprocessor, a main memory, a cache memory, a host communication interface, and a disk communication interface which are not illustrated. A plurality of controllers 212 may be provided to implement a redundant configuration. In this case, even when any one of the controllers 212 stops, the other controller 212 can inherit processing to operate the storage apparatus 21.

A plurality of host computers 22 may be provided in the user site 20. Host computers 22(1) to 22(n) will be referred to as a host computer 22 when the host computers are not distinguished particularly. A plurality of virtual computers 221 may be provided in the host computer 22. The virtual computer 221 reads and writes data from and to a datastore 222. The datastore 222 may be created from a storage device included in the host computer 22 or may be created by mounting the logical volume 211 in the storage apparatus 21.

The virtual computer 221 and the datastore 222 included in the host computer 22 may be divided and used in logical units called tenants 223. For example, different tenants 223 may be allocated to respective departments of a user company.

FIG. 4 illustrates a configuration of the service management computer 1. The service management computer 1 is installed in the vendor site 10 and stores configuration information and a computer program for providing a storage operational management service. The service management computer 1 may be configured by one physical computer, may be configured by cooperation of a plurality of physical computers, or may be configured as a virtual computer installed in a physical computer.

The service management computer 1 may be configured by a general-purpose computer. For example, the service management computer 1 includes a management interface 111, an input interface 112, an output interface 113, a microprocessor 114, a cache memory 115, an auxiliary storage device 116, and a program memory 117, and these circuits 111 to 117 are coupled by a communication bus 118.

The management interface 111 is a communication interface for inputting and outputting management information. The input interface 112 is coupled with an information input device which is not illustrated in the drawing. An operator of the service management computer 1 inputs information to the service management computer 1 using the information input device. Examples of the information input device include a keyboard, a mouse, a touch panel, and a voice instruction device. The output interface 113 is coupled with an information output device which is not illustrated in the drawing. The operator of the service management computer 1 checks information using the information output device. Examples of the information output device include a display, a printer, and an audio synthesis device. The service management computer 1 can transmit information to the operator using communication means such as an email.

The microprocessor 114 implements the functions of the service management computer 1 to be described later by executing a computer program stored in the program memory 117.

The cache memory 115 is a memory that stores data which is used frequently. The auxiliary storage device 116 is a device that stores a computer program such as, for example, an operating system, an application program, and a driver program.

The program memory 117 is a memory space for storing computer programs P11 to P17 necessary for operating the service management computer 1 and management information D11 to D17. For example, the program memory 117 may be generated using a volatile semiconductor memory or may be generated from a hard disk or a flash disk. Alternatively, the program memory 117 may be generated from memories of other forms.

The program memory 117 stores computer programs including an operation data collection program P11, a monitor information management program P12, a service menu management program P13, a contract management program P14, a similar task group generation program P15, an introduction effect management program P16, and a report creation management program P17.

The program memory 117 stores management information including providing service management information D11, contract information D12, a contract change history D13, a response time history D14, storage configuration information D15, I/O pattern management information D16, and similar task group management information D17. The details of the management information will be described later in FIGS. 5 to 11.

The operation data collection program P11 is a computer program for collecting operation data of the storage apparatus 21 from the user site 20. The operation data includes configuration information and performance information of the storage apparatus 21.

The monitor information management program P12 is a computer program for managing the operation data of the storage apparatus 21 collected from the user site 20 in correlation with the menu of the operational management service. In the following description, the operational management service is sometimes referred to as a service. The menu of the operational management service is sometimes referred to as a service menu.

The service menu management program P13 is a computer program for managing services being applied to the storage apparatus 21 and the features of the services. The contract management program P14 is a computer program for managing a service menu being provided to users and services applied in the past.

The similar task group generation program P15 is a computer program for classifying the storage apparatuses 21 into similar task groups on the basis of the operation data collected from the user site 20. The similar task group generation program P15 generates at least one similar task group on the basis of the I/O pattern, I/O load characteristics, and the like of the storage apparatus 21, for example.

The introduction effect management program P16 classifies the respective storage apparatuses 21 in the same similar task group into a storage apparatus for which improvement is necessary and a storage apparatus for which improvement is not necessary on the basis of a predetermined index.

The introduction effect management program P16 analyzes a past service contract history and the degree of improvement obtained by application of the service and determines the presence of effectiveness of service introduction.

The report creation management program P17 is a computer program for creating a report using the calculation result of the introduction effect management program P16. An example of the report will be described later in FIGS. 12 and 13. This report illustrates the effect obtained when a predetermined service which is applied to storage apparatuses for which improvement is not necessary but is not applied to storage apparatuses for which improvement is necessary is introduced to the storage apparatuses for which improvement is necessary. The introduction effect may be illustrated directly or may be illustrated indirectly.

The direct introduction effect is a predicted introduction effect obtained in storage apparatuses for which improvement is necessary when a predetermined service was introduced to the storage apparatuses for which improvement is necessary. The indirect introduction effect is an actual introduction effect obtained in storage apparatuses for which improvement is not necessary when a predetermined service was introduced to the storage apparatuses for which improvement is not necessary. A user who operates the storage apparatus 21 for which improvement is necessary can determine whether to introduce a predetermined service with reference to the indirect effect.

FIG. 5 illustrates an example of a table configuration of the providing service management information D11. The service management computer 1 retains the providing service management information D11. This management information D11 manages a service menu being provided by a storage operational management service.

For example, the providing service management information D11 manages a category C111, an index C112, a service menu C113, a providing service content C114, and an on-premises paid function and service C115 in correlation. In the drawing, the "providing service content" is simplified to "content" and the "on-premises paid function and service" is simplified to "paid function and service". The expressions of other items of management information to be described later are simplified appropriately.

The service menu C113 is classified by the category C111 which is the value pursued by each service. Examples of the category C111 include "performance", "response time", "cost", and "availability".

Indices for evaluating the service value indicated by the category C111 are recorded in the index C112. For example, when the category C111 is "performance", "response time" can be used as the index for evaluating performance. When the category C111 is "cost", "average IOPS/disk cost" can be used as the index for evaluating cost. The "average IOPS/disk cost" indicates a disk cost invested to process I/O requests. The IOPS is the number of I/Os per second. It is possible to determine whether a service being introduced (a service being applied) to the storage apparatus 21 is appropriate on the basis of the index set to the index C112.

The providing service content C114 includes the presence of a report and the content of tuning performed. The paid function and service C115 records a function or a service that is to be included in the storage apparatus 21 in order to provide the service indicated in the service menu C113. The storage apparatus 21 obtains the right to use the service menu provided by the service management computer 1 by including the paid function and service which are not included in the basic configuration.

By managing the index C112 and the service menu C113 in correlation in advance, it is possible to quickly specify a service which affects a predetermined index. Therefore, the service management computer 1 can quickly specify a service which is the cause of a performance difference when, for example, one storage apparatus and the other storage apparatus are compared from a performance perspective and exclude a service which is not associated with the performance difference from consideration target services.

In FIG. 5, due to a narrow display region, some expressions of the management information D11 are replaced with symbols TX(1) to TX(9). The content of the symbols TX(1) to TX(9) will be described below.

TX(1): Switch on layer control function
TX(2): Layer control function
TX(3): Change migration of logical volume and allocation of microprocessor
TX(4): Function of migrating logical volume between storage pools and function of changing allocation of microprocessor
TX(5): Cloud service
TX(6): Change migration of logical volume and allocation of microprocessor
TX(7): Function of migrating logical volume between storage pools and function of changing allocation of microprocessor
TX(8): Creation of volume copy
TX(9): Volume copy function FIG. 6 illustrates an example of a table configuration of the contract information D12. The service management computer 1 retains the contract information D12. The contract information D12 manages a service menu of a service being contracted by a user and appropriateness of information disclosure to other users.

For example, the contract information D12 manages user ID C121, a storage ID C122, a providing service C123, and operation data disclosure appropriateness C124 in correlation.

The user ID C121 records information for identifying a contracted user. The user ID is uniquely determined within the storage operational management system. The storage ID C122 records information for identifying the storage apparatus 21 being contracted by the user. The storage ID is also uniquely determined within the storage operational management system. The storage ID may be read "information for identifying a service application target apparatus", for example.

The providing service C123 records services being applied to the contracted storage apparatus 21. The operation data disclosure appropriateness C124 records information on whether the operation data of the contracted storage apparatus 21 will be disclosed. The user may or may not disclose services applied to the storage apparatus 21 operated by the user, a change in the operation data resulting from the services, and the like to other users.

FIG. 7 illustrates an example of a table configuration of the contract change history D13. The service management computer 1 retains the contract change history D13. This management information D13 manages the history of operational management services contracted by the user.

For example, the contract change history D13 manages a user ID C131, a contract renewal date C132, and a contract content C133 in correlation. The user ID C131 records information for specifying a contracted user similarly to the user ID C121 described in the contract information D12 in FIG. 6. In the following description, the same value is used for the user ID and the storage ID. The contract renewal date C132 records a contract date or a contract renewal date of a service. The contract content C13 records the content of a contracted service.

FIG. 8 illustrates an example of a table configuration of the response time history D14. The service management computer 1 retains the response time history D14. This management information D14 manages information on the response time acquired from the storage apparatus 21.

For example, the response time history D14 manages a user ID C141, a storage ID C142, an acquisition period C143, a response time C144, and an alarm flag C145 in correlation.

The user ID C141 records information for identifying a contracted user of the service. The storage ID C142 records information for identifying the storage apparatus 21 which is a response time measurement target. The acquisition period C143 records a period in which the response time of the storage apparatus 21 is acquired.

The response time C144 records the response time within a period defined in the acquisition period C143. The response time C144 may record all response time acquired within the acquisition period, an average value thereof, a largest value and a smallest value, a response time equal to or larger than a predetermined threshold value, or a response time smaller than a predetermined threshold value.

When a sudden deterioration in the response time is not to be taken into consideration as a performance deterioration, the average value of the response time in the acquisition period C143 may be recorded in the response time C144. In contrast, when a task in which a very short period of a deterioration in the response time is not allowable is operating on the storage apparatus 21, the largest value of the response time in the acquisition period C143 may be recorded in the response time C144.

The alarm flag C145 records information indicating whether the value recorded in the response time C144 exceeds a predetermined threshold value. "On" is recorded in the alarm flag C145 when the value exceeds the threshold value and "Null" is recorded when the value does not exceed the threshold value.

FIG. 9 illustrates an example of a table configuration of the storage configuration information D15. The service management computer 1 retains the storage configuration information D15. This management information D15 manages the configuration and the function of the storage apparatus 21.

For example, the storage configuration information D15 manages a user ID C151, apparatus information C152, a disk performance limit C153, a mounted flash memory volume C154, and a paid function and service C156 in correlation.

The user ID C151 records information for identifying a contracted user. The apparatus information C152 records information on the service target storage apparatus 21. The apparatus information C152 may include a storage ID and an apparatus type, for example. The storage ID is information for identifying the storage apparatus 21 to which the service is applied. The apparatus type is information indicating the type of the storage apparatus 21.

The disk performance limit C153 records a performance limit calculated from a disk mounted on the storage apparatus 21. The mounted flash memory volume C154 records the size of a flash memory (a flash disk) mounded on the storage apparatus 21. The paid function and service C155 records a function that is effective in the storage apparatus 21 identified by the storage ID and a service being applied to the storage apparatus 21.

FIG. 10 illustrates an example of a table configuration of the I/O pattern management information D16. The service management computer 1 retains the I/O pattern management information D16. The I/O pattern management information D16 manages information on I/O such as an I/O pattern and the number of I/Os, acquired from the user site 20.

For example, the I/O pattern management information D16 manages a user ID C161, a storage ID C162, the number of I/Os C163, an I/O change rate C164, a representative pattern C165, and an I/O pattern C166 in correlation.

The user ID C161 records information for identifying a contacted user. The storage ID C162 records information for identifying a service target storage apparatus 21.

The number of I/Os C163 records the present number of I/Os. The number of I/Os C163 may record an average value of IOPS of a previous month, for example. The I/O change rate C164 records the percentage of a change in IOPS in a past fixed period. The service management computer 1 calculates monthly average values of IOPS in a fixed period of a half year or one year, for example, calculates the rates of monthly changes from the previous months, and records the change rates in the I/O change rate C164. A plurality of average values of the change rates may be recorded in the I/O change rate C164.

The percentage of each of I/O patterns which are detected from the storage apparatus 21 and are prepared in advance is recorded in the I/O pattern C166. For example, the prepared I/O patterns include four patterns including random read (RR), random write (RW), sequential read (SR), and sequential write (SW). When it is determined that all I/Os to a certain storage apparatus 21 are random write, "100%" is recorded in a random write field of the I/O pattern C166. When it is determined that approximately ⅓ of I/Os to another storage apparatus 21 is random write and the remaining approximately ⅔ is random read, "33%" is recorded in a random write field of the I/O pattern C166 and "67%" is recorded in a random read field.

The representative pattern C165 records a pattern having the largest percentage among the respective patterns in the I/O pattern C166.

The I/O pattern may be classified more finely instead of classifying the same into four default patterns. For example, the I/O pattern may be classified more finely by a read-to-write ratio, a sequential access-to-random access ratio, and the like.

The features of the I/O pattern in each day of the week or each time period may be detected and classified on the basis of, for instance, a change in the number of I/Os in each day of the week or each time period. For example, the I/O pattern may be a "pattern in which sequential read occurs frequently in the daytime of weekdays" and a "pattern in which random write occurs frequently in the night time of holidays".

FIG. 11 illustrates an example of a table configuration of the similar task group management information D17. The service management computer 1 retains the similar task group management information D17. This management information D17 manages a storage apparatus and a similar task group to which the storage apparatus belongs. For example, the similar task group management information D17 manages a user ID C171, a storage ID C172, and a group ID C173 in correlation.

The user ID C171 records information for identifying a contracted user of the service. The storage ID C172 records information for identifying a service target storage apparatus 21. The group ID C173 records information for identifying a similar task group to which the storage apparatus 21 belongs. The similar task group is generated on the basis of the I/O pattern, the number of I/Os, and the I/O change rate of the storage apparatus 21 as will be described in FIG. 16.

FIGS. 12 and 13 illustrate an example of an introduction effect report created by the report creation management program P17 of the service management computer 1.

FIG. 12 illustrates an example of a report created on the basis of the contract change history D13 and the response time history D14. In FIG. 12, a vertical axis indicates a response time and a horizontal axis indicates time. The report in FIG. 12 illustrates the management information for identifying the target storage apparatus and the user and the values obtained when the target service was evaluated on the basis of a predetermined index.

FIG. 12 illustrates that the service is introduced to a storage apparatus "SC" operated by a user "UB" at time point T1. The introduced service is an I/O performance guaranteeing service, for example. Here, as illustrated in FIG. 5, the value pursued by the I/O performance guaranteeing service is "performance", and in the present embodiment, the response time is used as an index for evaluating performance.

According to FIG. 12, the response time of the storage apparatus "SC" in a period earlier than a service introduction time point T1 is higher than a threshold value Th. In contrast, the response time of the storage apparatus "SC" in a period later than the service introduction time point T1 is lower than the threshold value Th. FIG. 12 visualizes an improvement in the response time of the storage apparatus obtained due to introduction of the I/O performance guaranteeing service.

As described above, in the report illustrated in FIG. 12, whether the response time of the storage apparatus 21 has been improved due to introduction of the designated service is illustrated by a graph. In this report, the response time before introduction of the service and the response time after introduction of the service are displayed in comparison to show the introduction effect of the service quantitatively.

FIG. 13 illustrates another example of the introduction effect report. The report in FIG. 13 illustrates a distribution of an I/O load and a cumulative volume of the storage apparatus in a data migration service for optimally arranging data. In FIG. 13, a vertical axis indicates an average IOPS per hour and a horizontal axis indicates a cumulative volume. From the shape of the graph in FIG. 13, it is understood that many I/Os concentrate on some of the logical storage areas of the storage apparatus and a few I/Os occur in the other logical storage areas.

The report in FIG. 13 illustrates an ideal distribution (depicted by a solid line), an actual distribution in an improvement target storage apparatus (depicted by a one-dot-chain line), and an actual distribution in another storage apparatus to which the data migration service is applied (depicted by a dot line) for comparison. The ideal distribution is calculated by vendors as a distribution which is most effective in terms of performance and cost.

A user who operates the improvement target storage apparatus can determine whether to introduce the data migration service by checking the report in FIG. 13. For example, the user can determine whether the data migration service is suitable for the improvement target storage apparatus and whether the effect of the data migration service can be obtained if there is a certain gap from an ideal distribution.

FIG. 14 is a flowchart illustrating a process of the service management computer 1 acquiring the operation data of the storage apparatus 21 from the user site 20. In this process, the operation data collection apparatus 23 of the user site 20 transmits the operation data to the service management computer 1 at a designated interval. In contrast, the operation data collection program P11 of the service management computer 1 may transmit a transmission request to the operation data collection apparatus 23 and the operation data may be transmitted from the operation data collection apparatus 23 to the service management computer 1 using the transmission request as a trigger. When the operation data collection apparatus 23 is included in the storage apparatus 21, the operation data may be transmitted directly from the storage apparatus 21 to the service management computer 1.

In the process of FIG. 14, the operation data collection apparatus 23 transmits the operation data to the service management computer 1 at a predetermined data transmission interval. The service provider 41 may request the user 42 of the user site 20 to set the data transmission interval. The user 42 sets the data transmission interval to the operation data collection apparatus 23 according to this request. In contrast, the service management computer 1 may manually or automatically set the data transmission interval to the operation data collection apparatus 23. Alternatively, an initial value of the data transmission interval may be set in advance in the operation data collection apparatus 23.

The operation data collection apparatus 23 collects operation data from a monitoring target storage apparatus 21 on the basis of the set data transmission interval (S11) and transmits the collected operation data to the service management computer 1 (S12).

The operation data collection program P11 of the service management computer 1 receives the operation data from the operation data collection apparatus 23 (S13). The monitor information management program P12 executes a process of calculating, for example, an average value, a largest value, and a smallest value of the received operation data (S14).

The monitor information management program P12 updates management information to be updated among a group of items of management information retained in the service management computer 1 on the basis of the processing result (S15).

FIG. 15 is a flowchart illustrating a process of generating the similar task group. This process is executed by the similar task group generation program P15 of the service management computer 1.

As will be described later, the similar task group generation program P15 groups service target storage apparatuses 21 on the basis of an I/O pattern, an I/O change rate, and the number of I/Os, for example. The similar task group is configured across the user sites 20. That is, the similar task group is generated for all storage apparatuses 21 to which the service management computer 1 provides the service.

As described above, the I/O pattern is any one of random read (RR), random write (RW), sequential read (SR), and sequential write (SW). The I/O change rate is the percentage of a change in IOPS in a past fixed period. The number of I/Os indicates the present I/O load. A method of calculating the I/O change rate is as follows, for example. The service management computer 1 may calculate monthly average values of IOPS in a half year or one year, for example, calculate the rates of monthly changes in average IOPS from the previous months, and use an average value of these change rates as the I/O change rate. For example, an average value of IOPS in the previous month may be used as the number of I/Os.

The similar task group generation program P15 of the service management computer 1 repeatedly performs processes S22 to S26 for all storage apparatuses 21 recorded in the storage ID C162 by referring to the I/O pattern management information D16 (S21).

The similar task group generation program P15 classifies the I/O pattern into four groups of "RR", "RW", "SR", and "SW", recorded in the representative pattern C165 by referring to the representative pattern C165 of the I/O pattern management information D16 (S22). The similar task group generation program P15 repeatedly performs processes S24 to S26 for the four groups created in step S22 (S23).

The similar task group generation program P15 further classifies the storage apparatuses 21 belonging to each of the groups in which the representative I/O pattern appears. In order to classify the storage apparatuses, the similar task group generation program P15 selects a clustering method to classify storage apparatuses having a similar number of I/Os and a similar I/O change rate (S24).

When a k-mean method, for example, is used as the clustering method, it is necessary to input the number of groups indicating the number of classification groups in advance (S24). As for the I/O change rate, ranges may be defined in advance as, for instance, a decrease rate of 5% or more, an increase rate within ±5%, and an increate rate of 5% or more (S24).

The similar task group generation program P15 clusters the respective storage apparatuses 21 belonging to the same I/O group according to the clustering method selected or designated in step S24 to obtain a plurality of similar task groups (S25).

Finally, the similar task group generation program P15 records the result obtained in step S25 in the group ID C173 of the similar task group management information D17 (S26). That is, the similar task group generation program P15 assigns a group ID to each of the generated similar task groups and specifies a storage apparatus and a user belonging to the similar task group to update the similar task group D17.

FIG. 16 illustrates an example of clustering by the similar task group generation program P15. As described above, clustering for generating similar task groups is performed for each of the representative I/O patterns of the respective storage apparatuses 21.

FIG. 16 illustrates similar task groups generated by classifying a group of storage apparatuses having a largest random read rate. In FIG. 16, a vertical axis indicates an I/O change rate and a horizontal axis indicates the number of I/Os. Storage apparatuses having a large random read rate are plotted as black circular dots in FIG. 16.

In the example illustrated in FIG. 16, the I/O change rate is classified into three ranges of $\alpha$, $\beta$, and $\gamma$, and the number of I/Os is clustered using the k-mean method. As illustrated in the drawing, storage apparatuses having a similar I/O change rate and a similar number of I/Os are classified into the same group. As for the other representative I/O patterns (RW, SR, and SW), storage apparatuses having a similar I/O change rate and a similar number of I/Os are classified into the same group.

A service improvement suggestion process will be described with reference to FIGS. 17 and 18. The present embodiment illustrates an example of presenting a suggestion of improvement for a specific category among the categories in the category C111 of the providing service management information D11.

The category for which an improvement suggestion is presented may be designated by the user 42 or may be designated by the service provider 41 according to the service being provided to the storage apparatus 21. In the present embodiment, a case in which the category "performance" is selected will be described. In the present embodiment, "response time" is used as an index for evaluating the effect of "performance".

When the category for which an improvement suggestion is presented is "cost", "average IOPS/mounted disk cost", for example, is used as an index for evaluating the effect. When the category for which an improvement suggestion is presented is "availability", "RTO (Recovery Time Objective)" and "service suspension time" are used as the index. A method of presenting an improvement suggestion by taking a plurality of categories into consideration will be described later in other embodiments.

The process illustrated in FIGS. 17 and 18 is performed repeatedly for all similar task groups created in FIG. 15 (S31). The introduction effect management program P16 of the service management computer 1 determines whether an improvement target storage apparatus 21 is present by referring to the response time history D14 (S32). In this example, the response time is larger than the threshold value, and a storage apparatus 21 for which "present" is recorded in the alarm flag C145 is extracted as an improvement target storage apparatus.

The acquisition period C143 for acquiring the response time can be set appropriately to recent one week, this month, and the like (S32). When no improvement target storage apparatus is found (S32: NO), since it is not necessary to present an improvement suggestion, this process ends.

When one or more improvement target storage apparatuses 21 is found (S32: YES), the introduction effect management program P16 extracts all storage apparatuses 21 recorded in the storage ID C142, for which "present" is recorded in the alarm flag C145 of the response time history D14 (S33).

The introduction effect management program P16 determines whether there is a storage apparatus for which "Null" is recorded in the alarm flag C145 by referring to the response time history D14 (S34). Here, the acquisition period C143 is set to the same period as in step S32 (S34).

Here, the storage apparatus for which the response time is smaller than the threshold value is an example of the "second storage apparatus" and may be referred to as a model storage apparatus or a comparison target storage apparatus.

When no model storage apparatus is found (S34: NO), the flow proceeds to step S47 illustrated in FIG. 18 via a coupler B.

In contrast, when there is a model storage apparatus (S34: YES), the introduction effect management program P16 extracts all storage apparatuses 21 recorded in the storage ID C142, for which "Null" is recorded in the alarm flag C145 of the response time history D14 (S35).

The introduction effect management program P16 repeatedly performs processes S37 to S47 with respect to the improvement target storage apparatuses extracted in step S33 (S36). The introduction effect management program P16 extracts one model storage apparatus having a disk performance limit closest to the disk performance limit C153 of the improvement target storage apparatus among the model storage apparatuses 21 extracted in step S35 by referring to the disk performance limit C153 and the storage ID in the apparatus information C151 of the storage configuration information D15 (S37).

The contract management program P14 or the introduction effect management program P16 determines whether a service menu provided to the improvement target storage apparatus is different from a service menu provided to the model storage apparatus extracted in step S37 by referring to the providing service menu C123 and the storage ID C122 of the contract information D12 (step S38).

When the service being applied to the improvement target storage apparatus is the same as the service being applied to the model storage apparatus and there is no difference therebetween (S38: NO), the flow proceeds to step S47 in FIG. 19 via a coupler B.

In contrast, when the service menu provided to the improvement target storage apparatus is different from the service menu provided to the model storage apparatus (S38: YES), the introduction effect management program P16 extracts the difference (S39). Hereinafter, a service which is not applied to the improvement target storage apparatus but is applied to the model storage apparatus is sometimes referred to as a difference service. The difference service is an example of a "predetermined operational management service".

The flow proceeds to FIG. 18 via a coupler A. The introduction effect management program P16 repeatedly performs processes S41 to S47 for all difference services extracted in step S39 as necessary (S40).

The introduction effect management program P16 checks a period in which the difference service menu was introduced to the model storage apparatus by referring to the contract change history D13 of the model storage apparatus extracted in step S35 (S41).

The introduction effect management program P16 determines whether the response time is improved by the introduction of the service by comparing the service introduction period obtained in step S41 and the acquisition period C143 of the response time history D14 (S42). That is, it is determined whether the response time has decreased as compared to before the introduction of the service when the difference service was introduced to the model storage apparatus. Whether the response time is improved is determined on the basis of the average value of the response time in a fixed period and the number of times the response time exceeds the threshold value, for example. The fixed period may be several months before and after the introduction, or the response time may be compared every month or week, for example (step S42).

When the response time is not improved before and after the introduction of the difference service (S42: NO), the introduction effect management program P16 cannot suggest an improvement of the service menu to the improvement target storage apparatus. This is because it is impossible to check the effect of the introduction to the model storage apparatus, of the difference menu which is a difference in service menus between the model storage apparatus and the improvement target storage apparatus.

Therefore, the introduction effect management program P16 determines whether there is another service which is different between the improvement target storage apparatus and the model storage apparatus, other than the difference service which is the subject of step S41 (S46). When there is no other different service (S46: NO), the flow proceeds to step S47.

When the introduction effect management program P16 can check an improvement in the response time of the model storage apparatus (S42: YES), the report creation management program P17 checks whether the operation data of the improvement target storage apparatus and the model storage apparatus can be disclosed (S43).

That is, the report creation management program P17 refers to the contract information D12 to check whether the disclosure appropriateness C124 of the operation data is set to "YES" for both the improvement target storage apparatus extracted in step S33 and the model storage apparatus extracted in step S35.

For a storage apparatus for which "NO" is set to the disclosure appropriateness C124 of the contract information D12, the operation data thereof cannot be disclosed to other users. However, in the present embodiment, setting is established where a user who rejects disclosure cannot browse the operation data of the storage apparatus 21 operated by the other user (S43).

When disclosure of the operation data is rejected (S43: NO), the report creation management program P17 cannot present the actual operation data as an improvement suggestion. Therefore, the report creation management program P17 creates a report in such a format that does not disclose the actual operation data and presents the report to the user of the improvement target storage apparatus (S45). For example, the report creation management program P17 calculates an introduction effect from the information obtained in step S42 by selecting a target period and a target index according to the rule of the service provider, creates a report including the introduction effect, and presents the report to the user of the improvement target storage apparatus (S45).

When the operation data of the improvement target storage apparatus and the model storage apparatus is disclosed (S43: YES), the report creation management program P17 creates such a report as illustrated in FIGS. 12 and 13 and presents the report to the user of the improvement target storage apparatus (S44).

The introduction effect report can be presented to users according to a plurality of methods. For example, the introduction effect report may be created as an electronic file and be attached to an email transmitted to the user terminal 3. Alternatively, the introduction effect report may be uploaded to a portal site for users so that users can browse the report on the portal site for users.

When there is no model storage apparatus (S34: NO) and there is no difference in service menus between the model storage apparatus and the improvement target storage apparatus (S38: NO), it is not possible to present an improvement suggestion by referring to other storage apparatuses in the same similar task group. Therefore, the service management computer 1 guides the user of the improvement target storage apparatus to an option service for analyzing the cause of performance deterioration in detail (S47).

A process when the category C111 is "cost" will be described. In this case, the introduction effect management program P16 classifies the respective storage apparatuses in the similar task group created in FIG. 15 into two groups using "average IOPS of storage apparatus/mounted disk cost", for example, as an index. The introduction effect management program P16 classifies the respective storage apparatuses in the same similar task group into a storage apparatus (an improvement target storage apparatus) in which the index value is equal to or smaller than a threshold value and a storage apparatus (a model storage apparatus) in which the index value is equal to or larger than the threshold value (steps corresponding to S32 and S34).

In step S37, the introduction effect management program P16 selects a storage apparatus of which the use is the closest to that of the model storage apparatus. That is, the introduction effect management program P16 extracts a storage apparatus of which the plot distance is the closest within the same similar task group illustrated in FIG. 16 rather than selecting a storage apparatus of which the specification is the closest to that of the model storage apparatus.

The service management computer 1 manages the history of (average IOPS of storage apparatus)/(mounted disk cost) similarly to the response time history D14 and calculates and reports the service introduction effect by comparing the history with the contract change history D13.

According to the present embodiment having the above-described configuration, the following advantages are obtained. In the present embodiment, since the user of an improvement target storage apparatus can check the effect obtained when a service being applied to a model storage apparatus only is introduced from the report, the user can determine whether to apply the service to the improvement target storage apparatus. In this way, it is possible to suggest an operational management service appropriate to an operation state of the user and the usability of the user is improved.

Since the service management computer 1 of the present embodiment detects the use states of respective storage apparatuses from the operation data and classifies the respective storage apparatuses, the user does not need to disclose information on an execution state of a certain task. As a result, the user can receive a suggestion of an appropriate operational management service by disclosing the operation data to the service management computer 1, and the usability is improved further.

In the above-described example, a method in which the service menus C113 being applied to storages within a similar task group are compared and a service menu being applied to a storage which shows a better operation data in term of the index C112 is presented to a storage in which there is a room for improvement has been described. The presented content is not limited to the service menu. For example, the function illustrated in C115 such as a layer control function or a volume copying function may be presented as an improvement suggestion.

The improvement suggestion which utilizes past cases of other storages can be applied to troubleshooting and prognostic detection.

An example of troubleshooting will be described. When a fault occurs in a certain storage, it is checked whether an equivalent fault event occurred in other storages in a similar task group to which the storage belongs. As a result, when the equivalent event occurred, a countermeasure against the event is checked and the countermeasure is applied to a storage where a fault occurred on the basis of the successibility and a recovery time. Since this management technique correlates the occurred event and the countermeasure with each other, a countermeasure can be automatically executed on an event which occurs frequently, for example. Management of successibility and the recovery time is an example and the present invention is not limited thereto.

An example of prognostic detection will be described. The shape or the like of a graph of operation data of a certain storage of a user is analyzed on the basis of operation data such as past performance information, volume information, and the like of other storages in the same similar task group, and a fault, a performance deterioration, and a lack in a storage volume which may occur in the future are detected.

Moreover, by presenting a countermeasure which was effective among the countermeasures taken in the past to the other storages to the user, it is possible to prevent faults, a performance deterioration, and a lack in a storage volume in advance. Moreover, this improvement suggestion can be applied to suggestion of a disk replacement period of a certain storage. It is possible to specify other storages having an operation state similar to that of a certain storage on the basis of the similar task group and the asset information and to predict a disk replacement period of the storage in advance on the basis of a fault occurrence frequency and a disk replacement period in the past of the specified other storages.

Embodiment 2

A second embodiment will be described. The following embodiments including the present embodiment correspond to modifications of the first embodiment, and differences from the first embodiment will be described mainly.

In the present embodiment, it is determined whether a service being provided is appropriate in terms of the plurality of categories C111.

By performing the improvement suggestion process described in FIGS. 17 and 18 independently for each of the plurality of categories designated by the user or the service provider, it is possible to determine the appropriateness of the service in terms of the plurality of categories. Alternatively, the improvement suggestion process described in FIGS. 17 and 18 may be performed for all categories. However, in the present embodiment, a method of presenting an improvement suggestion of the service menu by taking the plurality of categories into consideration at one time will be described.

In the providing service management information D11, the "data migration service" and the "I/O performance guaranteeing service" recorded in the service menu C113 are services which belong to the categories "performance" and "cost" and which pursue values in these categories.

Therefore, for example, in step S37 of FIG. 17, a plurality of model storage apparatuses are selected as candidates in descending order of similarities to the specification of the improvement target storage apparatus rather than selecting one model storage apparatus of which the specification is the closest to the specification of the improvement target storage apparatus. A storage apparatus of which the mounting disk cost is the lowest among the candidates may be extracted as a comparison target storage apparatus. In this way, it is possible to suggest an improvement of the service menu using a storage apparatus which takes the categories "performance" and "cost" into consideration.

In the case of a service menu, similarly to the data migration service which belongs to a plurality of categories, the service menu may be presented as an improvement suggestion when the service menu shows an introduction effect for all categories.

For example, in the processes illustrated in FIGS. 17 and 18, when "data migration service" and the "I/O performance guaranteeing service" are extracted in step S39 and the introduction effect is confirmed in step S42, determination proceeds to the "cost" category. When the introduction effect is confirmed for the "cost" category, the service is presented as an improvement suggestion.

The present embodiment having the above-described configuration provides the same advantages as the first embodiment. In the present embodiment, it is possible to suggest an improvement in the service menu in terms of a plurality of categories in a relatively short period.

Embodiment 3

A third embodiment will be described. In the first embodiment, an example of applying the service menu to the entire storage apparatus 21 has been described. In contrast, in the present embodiment, the service menu may be applied to respective logical volumes 211 or respective groups of logical volumes 211 grouped in task operating units, for example. Although not illustrated in the drawings, since those skilled in the art can easily understand that the operational management service can be applied to respective structures smaller than the storage apparatus, further description thereof will not be provided.

Embodiment 4

A fourth embodiment will be described with reference to FIG. 19. In the present embodiment, a service menu provided to the storage apparatus 21 of a user is reconsidered according to a request from the user.

This process starts when a service menu reconsideration request is issued from a user. The user logs in to the service management computer 1 using the user terminal 3, for example, to request a reconsideration of the service (S51). The user designates a storage apparatus to which the service is being applied and requests evaluation of the service being applied to the storage apparatus (S51). The user may transmit the service reconsideration request to the service management computer 1 using other means such as an email.

Although a service reconsideration target is set for respective categories C111, an example in which the category C111 is "cost" will be described.

Upon receiving a service reconsideration request (evaluation request), the similar task group generation program P15 of the service management computer 1 refers to the similar task group management information D17. The similar task group generation program P15 rearranges all storage apparatuses included in a similar task group to which a reconsideration target storage apparatus belongs according to a predetermined index (S52). In this example, the storage apparatuses are rearranged in descending order using "average IOPS/mounted disk cost" as the predetermined index (S52).

The introduction effect management program P16 of the service management computer 1 determines whether the rank R1 of the reconsideration target storage apparatus is equal to or lower than a predetermined rank ThR (S53). When the similar task group to which the reconsideration target storage apparatus belongs includes RN storage apparatuses, the predetermined rank ThR may be the (RN/2)-th rank from the lowest rank or may be the (RN/4)-th rank from the lowest rank. The predetermined rank ThR may be designated manually by the user of the service provider, or a fixed value may be stored in advance in the service management computer 1. The predetermined rank ThR serving as a determination threshold value may be changed according to a service reconsideration target or an index used.

When the rank R1 for a predetermined index of the reconsideration target storage apparatus is not lower than the predetermined rank ThR in the similar task group (S53: NO), there may be no room for improvement even when the service menu is reconsidered. This is because the rank R1 of the reconsideration target storage apparatus is equal to or higher than the predetermined rank ThR and it is considered that no particular problem occurs.

In this case, the introduction effect management program P16 asks the user whether it is okay to reconsider the service menu (S54). This confirmation notification may be transmitted via an email or a dedicated portal site to which the user logs in.

The user terminal 3 displays a message that a notification from the service management computer 1 will be received and receives a user's determination result. The user terminal 3 determines whether the user's determination result is "reconsider the service" (S55). When the user's determination result is "stop reconsideration of the service" (S55: NO), the user terminal 3 ends this process. In contrast, when the user's determination result is "reconsider the service" (S55: YES), the user terminal 3 transmits a message that the service is to be reconsidered to the service management computer 1 (S56).

When the user requests service reconsideration, the contract management program P14 of the service management computer 1 temporarily cancels the service contracted by the user by referring to the contract information D12 (S56).

The contract management program P14 may cancel all services applied to the reconsideration target storage apparatus or may cancel a service menu of which the category C111 is "cost" (S56). The contract management program P14 sets a period in which the service is cancelled to a period in which the operation data necessary for reconsidering the effect of the service can be acquired.

The introduction effect management program P16 executes the improvement suggestion process described in FIGS. 17 and 18 after cancelling the service (S57). In this way, the introduction effect management program P16 suggests improvement of the service menu to the storage apparatus which cancelled at least a portion of the service. When the service cancelled in step S56 is helpful to the reconsideration target storage apparatus, the service management computer 1 suggests the user to apply the cancelled service to the storage apparatus. In contrast, when the service cancelled in step S56 is not necessary for the reconsideration target storage apparatus, the service management computer 1 does not suggest the cancelled service to the user.

The present embodiment having the above-described configuration provides the same advantages as the first embodiment. In the present embodiment, the user can allow the service management computer 1 to evaluate the service menu applied to a storage apparatus being operated. Therefore, in the present embodiment, it is possible to reconsider a service being applied presently as well as suggest a new service which is not yet applied and the usability is improved.

The present invention is not limited to the above-described embodiments. Those skilled in the art can make various additions and changes within the scope of the present invention.

REFERENCE SIGNS LIST

1 Service management computer (Storage operational management service providing apparatus)
3 User terminal
10 Vendor site
11 Operational management service providing unit
12 Operation data collection unit
13 Management information management unit
14 Similar group generation unit
15 Service difference extraction unit
16 Suggestion unit
17 Effect calculation unit
18 Evaluation unit
20 User site
21 Storage apparatus
22 Host computer
23 Operation data collection unit

The invention claimed is:

1. A storage operational management service providing apparatus that provides one or more operational management services to a plurality of storage apparatuses of a plurality of user sites via a communication network, the apparatus comprising:
a processor;
a memory storing instructions that, when executed by the processor, cause the processor to:
classify the plurality of storage apparatuses of the plurality of user sites on the basis of use states of the plurality of storage apparatuses,
generate at least one group including two or more storage apparatuses of the plurality of storage apparatuses,
detect, out of the two or more storage apparatuses that constitute the group, a first storage apparatus that is inferior in terms of a predetermined index and a second storage apparatus that is superior to the first storage apparatus in terms of the predetermined index,
extract a difference service which is not presently applied to the first storage apparatus and which is presently applied to the second storage apparatus,
determine a time at which the difference service was started to be applied to the second storage apparatus,
determine whether the predetermined index of the second storage apparatus improved after the time at which the difference service was started to be applied to the second storage apparatus, and
upon determining that the predetermined index of the second storage apparatus improved after the time at which the difference service was started to be applied to the second storage apparatus, output an introduction effect report indicating an improvement of the predetermined index of the second storage apparatus after the time at which the difference service was applied to the second storage apparatus.

2. The storage operational management service providing apparatus according to claim 1, wherein the instructions further cause the processor to:
when a plurality of second storage apparatuses that are superior to the first storage apparatus in terms of the predetermined index are detected, select a second storage apparatus, having a predetermined specification most similar to that of the first storage apparatus, from among the plurality of second storage apparatuses, and
extract the difference service which is presently applied to the selected second storage apparatus and which is not presently applied to the first storage apparatus.

3. The storage operational management service providing apparatus according to claim 2, wherein the instructions further cause the processor to:
collect operation data indicating the use states of the plurality of storage apparatuses via the communication network, and
generate the at least one group by classifying the operation data on the basis of a predetermined group generation criteria.

4. The storage operational management service providing apparatus according to claim 3, wherein the memory stores a plurality of different types of predetermined indices, and
select at least one of the plurality of indices as the predetermined index.

5. The storage operational management service providing apparatus according to claim 4, wherein
the one or more operational management services provided to the plurality of storage apparatuses are correlated with the plurality of indices.

6. The storage operational management service providing apparatus according to claim 5, wherein the instructions further cause the processor to:
extract the difference service from among the operational management services which are correlated with the predetermined index.

7. The storage operational management service providing apparatus according to claim 3, wherein
the operation data includes information on at least input/output (I/O) of each of the plurality of storage apparatuses, and
the group is generated on the basis of a same respective I/O pattern and a change rate of the I/O from the operation data.

8. The storage operational management service providing apparatus according to claim 1, wherein the instructions further cause the processor to:
output the introduction effect report when an amount of the improvement of the predetermined index after the time at which the difference service was applied to the second storage apparatus is equal to or larger than a predetermined value.

9. The storage operational management service providing apparatus according to claim 8, wherein
when the first storage apparatus and the second storage apparatus permit disclosure of the operation data, the introduction effect report includes the operation data of the first storage apparatus and the operation data of the second storage apparatus.

10. The storage operational management service providing apparatus according to claim 8, wherein the instructions further cause the processor to:
receive a designation of the first storage apparatus and evaluate at least one of the operational management services applied to the designated first storage apparatus,
cancel application of a first operational management service of the operational management services applied to the designated first storage apparatus before detecting the difference service.

11. The storage operational management service providing apparatus according to claim 1, wherein
the one or more operational management services are respectively applied, for each of the plurality of storage apparatuses, to an entirety of the respective storage apparatus or a storage area included in the respective storage apparatus.

12. An operational management service providing method of providing one or more operational management services from a service management computer to a plurality of storage apparatuses of a plurality of user sites via a communication network, the method executed by a processor of the service management computer and comprising:
classifying the plurality of storage apparatuses of the plurality of user sites on the basis of use states of the plurality of storage apparatuses;
generating at least one group including two or more storage apparatuses of the plurality of storage apparatuses;
detecting, among the two or more storage apparatuses that constitute the group, a first storage apparatus that is inferior in terms of a predetermined index;
detecting, among the two or more storage apparatuses that constitute the group, a second storage apparatus that is superior to the first storage apparatus in terms of the predetermined index;
extracting a difference service which is not presently applied to the first storage apparatus and which is applied to the second storage apparatus;
determining a time at which the difference service was started to be applied to the second storage apparatus;
determining whether the predetermined index of the second storage apparatus improved after the time at which the difference service was started to be applied to the second storage apparatus; and
upon determining that the predetermined index of the second storage apparatus improved after the time at which the difference service was started to be applied to the second storage apparatus, outputting an introduction effect report indicating an improvement of the predetermined index of the second storage apparatus after the time at which the difference service was applied to the second storage apparatus.

13. A storage operational management system including comprising:
a plurality of storage apparatuses disposed at a plurality of user sites; and
a service management computer coupled with the plurality of storage apparatuses via a communication network, and including a processor and a memory storing instructions that, when executed by the processor, cause the processor to:
collect operation data indicating use states of the plurality of storage apparatuses via the communication network,
classify the plurality of storage apparatuses of the plurality of user sites on the basis of the operation data indicating the use states of the plurality of storage apparatuses,
generate at least one group including two or more storage apparatuses of the plurality of storage apparatuses,
detect, out of the two or more storage apparatuses that constitute the group, a first storage apparatus that is inferior in terms of a predetermined index and a second storage apparatus that is superior to the first storage apparatus in terms of the predetermined index,
extract a difference service which is not presently applied to the first storage apparatus and which is presently applied to the second storage apparatus,
determine a time at which the difference service was started to be applied to the second storage apparatus,
determine whether the predetermined index of the second storage apparatus improved after the time at which the difference service was started to be applied to the second storage apparatus, and
upon determining that the predetermined index of the second storage apparatus improved after the time at which the difference service was started to be applied to the second storage apparatus, output an introduction effect report indicating an improvement of the predetermined index of the second storage apparatus after the time at which the difference service was applied to the second storage apparatus.

* * * * *